(12) United States Patent
Martin

(10) Patent No.: US 8,393,444 B2
(45) Date of Patent: Mar. 12, 2013

(54) SUSPENSION PROTECTION SYSTEMS AND METHODS

(76) Inventor: Jeffery Martin, Boulder, CO (US)

(*) Notice: Subject to any disclaimer, the term of this patent is extended or adjusted under 35 U.S.C. 154(b) by 1570 days.

(21) Appl. No.: 11/858,690

(22) Filed: Sep. 20, 2007

(65) Prior Publication Data

US 2009/0079113 A1   Mar. 26, 2009

(51) Int. Cl.
*F16D 57/00* (2006.01)
*B62K 1/00* (2006.01)

(52) U.S. Cl. .................. 188/266; 267/219; 280/276
(58) Field of Classification Search .......... 188/266, 188/266.1, 281; 267/219, 221; 280/276, 280/277, 279
See application file for complete search history.

(56) References Cited

U.S. PATENT DOCUMENTS

| | | | |
|---|---|---|---|
| 2,422,795 A | 6/1947 | McKnight | |
| 2,909,244 A * | 10/1959 | Kraft | 188/29 |
| 4,002,327 A * | 1/1977 | Damon | 267/281 |
| 4,044,977 A * | 8/1977 | Feucht | 267/141.3 |
| 4,441,736 A | 4/1984 | Shedden | |
| 4,521,002 A * | 6/1985 | Adorjan et al. | 267/221 |
| D283,414 S | 4/1986 | Shedden | |
| D289,987 S | 5/1987 | Junes | |
| 4,817,928 A * | 4/1989 | Paton | 267/219 |
| 4,896,752 A * | 1/1990 | Shtarkman | 188/266.1 |
| D324,664 S | 3/1992 | Burnette | |
| D398,564 S | 9/1998 | Patterson | |
| D423,414 S | 4/2000 | Carlton | |
| 6,065,914 A | 5/2000 | Fotou | |
| 6,199,828 B1 | 3/2001 | Komperud | |
| 2010/0187060 A1* | 7/2010 | Seidl | 188/322.16 |

* cited by examiner

*Primary Examiner* — Melody Burch
(74) *Attorney, Agent, or Firm* — Kilpatrick Townsend and Stockton LLP

(57) ABSTRACT

Suspension protection devices and methods involve a suspension mount engagement member configured to contact a suspension mount of a vehicle, a tire engagement member configured to contact a tire of the vehicle, and a rebounding assembly coupled between the suspension mount engagement member and the tire engagement member. The rebounding assembly can include a support, a first rebounding member, and a second rebounding member, wherein the first rebounding member is more compressible than the second rebounding member.

10 Claims, 14 Drawing Sheets

SUSPENSION PROTECTION SYSTEMS AND METHODS

BACKGROUND OF THE INVENTION

Embodiments of the present invention relate to systems and methods for protecting the suspension of a vehicle, and more particularly to rebounding mechanisms for protecting the fork suspension of a motorcycle.

When trailering or carrying a motorcycle or any other type of vehicle, it is common to load the vehicle onto a trailer, a bed of a truck, or any other surface. The vehicle is then tightly strapped down to the trailer or truck bed. Accordingly, the suspension system of the vehicle absorbs a compressive load that results from strapping down the vehicle. Some degree of induced compression in the suspension system is desirable, and can help provide stability and prevent or inhibit the vehicle from tipping over. However, often the suspension system of the vehicle becomes overcompressed during loading, or during transport as the trailer or truck travels over bumpy roads. Overcompression in the suspension system can also occur as a result of braking and cornering events during transport. In many instances, suspension systems include oil and/or air based damping mechanisms which can include springs and seals. Unfortunately, overcompression can be damaging to a suspension system, particularly when overcompression occurs frequently or over extended periods of time. For example, damping mechanisms and other components of suspension systems may suffer from air or fluid loss, spring fatigue, seal damage, and the like. Current approaches for protecting suspension systems often involve devices which are difficult to install in a motorcycle or other transported vehicle, or are static and lack the benefit of dynamic opposing forces.

What is needed are improved systems and methods for protecting suspension systems of vehicles when they are loaded or transported on a trailer or truck bed. It would be particularly beneficial if these improved techniques encompassed suspension protection systems that can be easily installed by a user. Relatedly, it would be beneficial if the improved systems and methods provided a dynamism of opposing forces resulting in enhanced stability characteristics. Moreover, it would be beneficial if the improved systems and methods involved a suspension protection system exhibited a variable compressibility profile. Embodiments of the present disclosure provide solutions to at least some of these needs.

BRIEF SUMMARY OF THE INVENTION

Embodiments disclosed herein provide devices and methods for protecting the suspension of a transported vehicle. Such devices can absorb or reduce a compressive load that is transferred to the vehicle suspension when the vehicle is strapped down or otherwise restrained to a trailer, a truck bed, or other transport surface. In some cases, a protection device can be placed between the fender and the tire of a motorcycle, so as to prevent unwanted damage from occurring to the motorcycle fork. Such devices can protect springs in the motorcycle fork from becoming overcompressed during transport, which may otherwise occur if the device is not used. Advantageously, embodiments of the present invention provide suspension protection systems that can be easily and efficiently installed by a user or operator onto a vehicle such as a motorcycle. Such suspension protection systems can exhibit a variable compressibility profile. Moreover, embodiments of the present invention encompass suspension protection systems that provide positive benefits of dynamic opposing forces, for example by increasing or modulating dynamic opposing forces on restraining or tie-down straps which secure the vehicle. During transport, as a vehicle is subject to compressive forces such as travel over bumpy roads, braking, and cornering events, the suspension protection system can prevent the suspension of the vehicle from becoming subject to unwanted levels of compression, and can also maintain tautness in cinching devices used to secure the vehicle to a transport surface.

In a first aspect, embodiments of the present invention encompasses a suspension protection system. The system includes a suspension mount engagement member configured to contact a suspension mount of a vehicle, a tire engagement member configured to contact a tire of the vehicle, and a rebounding assembly coupled between the suspension mount engagement member and the tire engagement member. The rebounding assembly includes a support having a proximal end and a distal end, a first rebounding member disposed toward the proximal end of the support, between the suspension mount engagement member and the tire engagement member, and a second rebounding member disposed toward the distal end of the support, between the suspension mount engagement member and the tire engagement member. The first rebounding member is disposed proximal to the second rebounding member, and is more compressible than the second rebounding member. The first rebounding member may include a first spring. The second rebounding member may include a second spring. In some cases, the first rebounding member includes a first spring having a first spring rate, and the second rebounding member includes a second spring having a second spring rate, such that the first spring rate is less than the second spring rate. The first rebounding member may include a first elastomer. The second rebounding member may include a second elastomer. In some cases, the first rebounding member includes a first elastomer, the second rebounding member includes a second elastomer, and the first elastomer is more compressible than the second elastomer. Optionally, the first rebounding member may include a fluid. Similarly, the second rebounding member may include a fluid.

In another aspect, embodiments of the present invention encompass a suspension protection system that includes a suspension mount engagement member configured to contact a suspension mount of a vehicle, a tire engagement member configured to contact a tire of the vehicle, and a rebounding assembly disposed at least partially between the suspension mount engagement member and the tire engagement member. The rebounding assembly may provide a compressibility profile having a first compressibility corresponding to a first compression distance, and a second compressibility corresponding to a second compression distance. The first compressibility can be higher than the second compressibility, and the first compression distance can be smaller than the second compression distance. In some cases, the rebounding assembly includes a spring. In some cases, the rebounding assembly includes an elastomer. Optionally, the rebounding assembly may include a fluid. According to some embodiments, the rebounding assembly includes a first spring having a first spring rate, and a second spring having a second spring rate, such that the first spring rate is less than the second spring rate. In some embodiments, the rebounding assembly includes a first elastomer and a second elastomer, where the first elastomer is more compressible than the second elastomer.

In a further aspect, embodiments of the present invention encompass a method of installing a suspension protection system in a vehicle. The method may include compressing the suspension protection system with a first compressive force so as to shorten the suspension protection system, placing the suspension protection system between a suspension mount of the vehicle and a tire of the vehicle, allowing the system to lengthen such that a suspension mount engagement of the suspension protection system contacts the suspension mount and a tire engagement member of the suspension protection system contacts the tire, and fastening the vehicle relative to a surface so as to compress the suspension protection system with a second compressive force that is greater than the first compressive force. In some cases, a first friction force opposes relative movement between the suspension mount engagement member of the suspension protection system and the suspension mount, and a second friction force opposes relative movement between the tire engagement member of the suspension protection system and the tire.

In yet another aspect, embodiments of the present invention include a method of manufacturing a suspension protection system. The method may include placing a rebounding assembly at least partially between a suspension mount engagement member and a tire engagement member, where the suspension mount engagement member is configured to contact a suspension mount of a vehicle and the tire engagement member is configured to contact a tire of the vehicle. The method may also include coupling the rebounding assembly with the suspension mount engagement member and the tire engagement member. The rebounding assembly may provide a compressibility profile having a first compressibility corresponding to a first compression distance, and a second compressibility corresponding to a second compression distance, such that the first compressibility is higher than the second compressibility, and the first compression distance is smaller than the second compression distance. In some cases, the rebounding assembly includes a spring. In some cases, the rebounding assembly includes an elastomer. In some cases, the rebounding assembly includes a fluid. According to some embodiments, the rebounding assembly includes a first spring having a first spring rate, and a second spring having a second spring rate, such that the first spring rate is less than the second spring rate. In some embodiments, the rebounding assembly includes a first elastomer and a second elastomer, where the first elastomer is more compressible than the second elastomer.

For a fuller understanding of the nature and advantages of the present invention, reference should be had to the ensuing detailed description taken in conjunction with the accompanying drawings.

DETAILED DESCRIPTION OF THE INVENTION

Figures 1A, 1B:
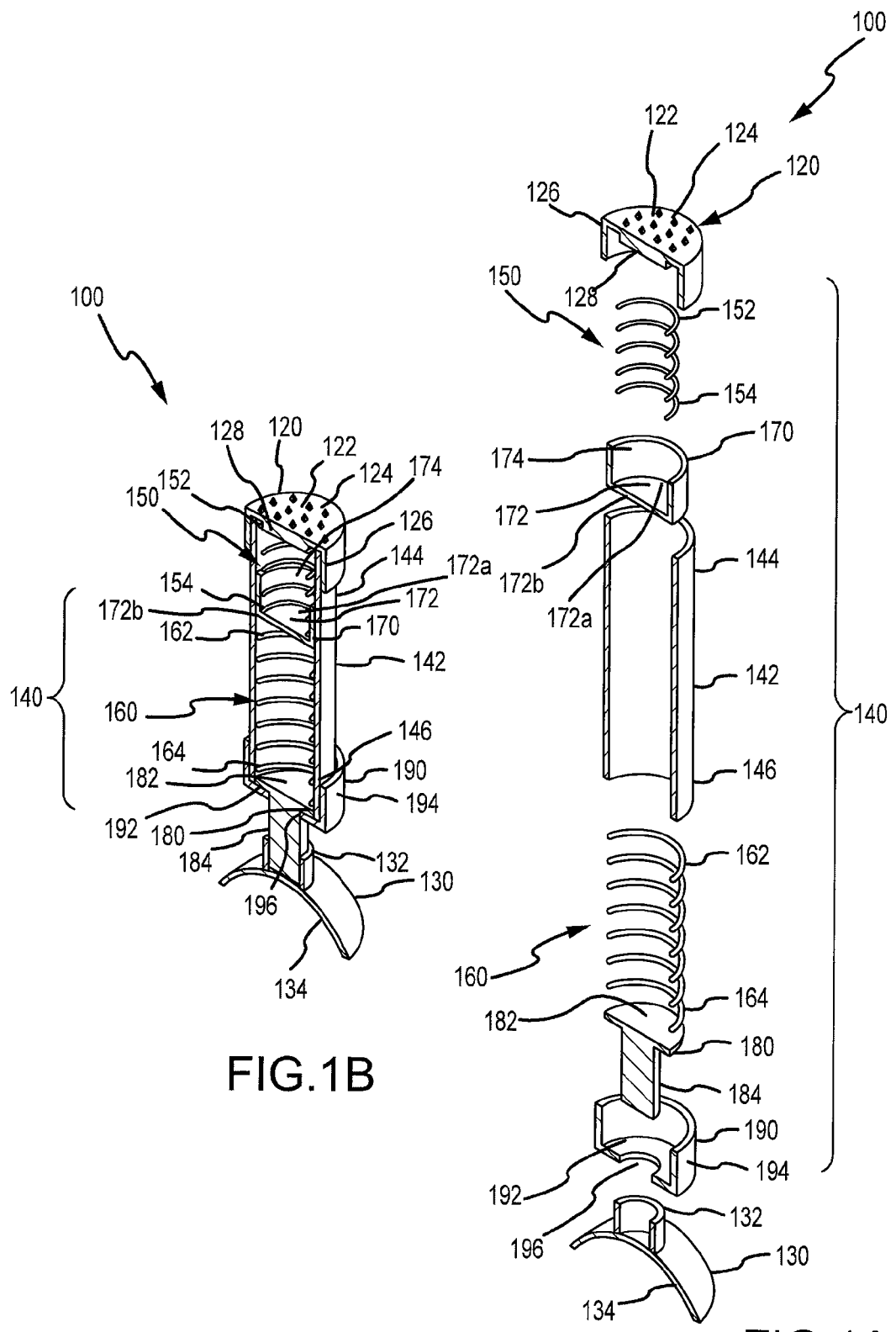
FIGS. 1A and 1B show a suspension protection system according to embodiments of the present invention.

Embodiments of the present invention can be adapted for use with any of a variety of vehicles, including motorcycles, all terrain vehicles, quad cycles, three wheelers, and the like. These systems and methods embodiment are well suited for use with any vehicle having a suspension that may become overcompressed during loading or transport.

Typically, embodiments include a rebounding device or assembly having a desired compressibility profile. The term "compressibility" can refer to the amount or magnitude of change in the length or other dimension or property of a compressible device in response to an applied stress, pressure, or force. As noted above, compressible devices can include rebounding members such as springs, elastomers, elasticized members, and the like. Such a suspension protection systems can exhibit a variable compressibility profile. For example, a suspension protection system can provide a compressibility profile that encompasses a first higher compressibility and a second lower compressibility, such that an operator or user can easily install the system onto a vehicle when the system is in the first compressibility configuration, and the vehicle can then be loaded or transported when the system is in the second compressibility configuration. For example, the operator can apply a compressive force to a rebounding assembly so as to reduce the length of the assembly, place the assembly between a suspension mount and tire of a vehicle, and release the compressive force so that the rebounding assembly increases in length and contacts the suspension mount and tire. Friction forces between a proximal section of the rebounding assembly and the vehicle suspension mount, and between the distal section of the rebounding assembly and the vehicle tire, can help to secure or hold the rebounding assembly in place.

The term "proximal" can refer to a portion of a rebounding assembly, or a portion of an assembly component, that is disposed toward a suspension mount of a vehicle when the rebounding assembly is mounted on the vehicle. Relatedly, the term "distal" can refer to a portion of a rebounding assembly, or a portion of an assembly component, that is disposed toward a tire of a vehicle when the rebounding assembly is mounted on the vehicle. According to some embodiments of the present invention, a distal rebounding element or a distal portion of a rebounding element may be less compressible than a proximal rebounding element or a proximal portion of a rebounding element. It is understood that embodiments of the present invention are not limited to such configurations, however, and therefore encompass variations where a distal rebounding element or a distal portion of a rebounding element may be more compressible than a proximal rebounding element or a proximal portion of a rebounding element. It is also understood that rebounding elements may be arranged in any of a variety of configurations. For example, a first rebounding member, or a portion thereof, may be disposed distal to a second rebounding member; a first rebounding member, or a portion thereof, may be disposed proximal to a second rebounding member; a second rebounding member, or a portion thereof, may be disposed distal to a first rebounding member; or a second rebounding member, or a portion thereof, may be disposed proximal to a first rebounding member. In some cases, a first rebounding member may be disposed at least partially within a second rebounding member. In some cases, a second rebounding member may be disposed at least partially within a first rebounding member. Likewise, a first rebounding member, or a portion thereof, may be disposed adjacent to a second rebounding member, or a portion thereof, such as in a side-by-side configuration. Further, it is understood that rebounding elements may present any desire shape, contour, or geometrical configuration. Hence, in addition to the circular cross-section shapes depicted herein, a rebounding member may also present a non-circular cross-section. In some embodiments a rebounding member may include a solid element without voids, and in some embodiments a rebounding member may include a solid element with voids. Such voids may be present at the interior or the exterior of the solid element. Selective placement of one or more voids at the interior or exterior of a rebounding member can provide a variable or differential compressibility profile for the rebounding member. What is more, it is understood that a rebounding assembly according to embodiments of the present invention may present any of a variety of combinations or permutations of rebounding members. For example, a rebounding assembly may include two rebounding members, each having a low compressibility, along with one rebounding member having a high compressibility.

Turning now to the drawings, FIG. 1A illustrates an exploded cross section view of a suspension protection system 100. As shown here, suspension protection system 100 includes a suspension mount engagement member 120, a tire engagement member 130, and a rebounding assembly 140 coupled between suspension mount engagement member 120 and tire engagement member 130. Suspension mount engagement member 120 is configured to contact a suspension mount of a vehicle and tire engagement member 130 is configured to contact a tire of the vehicle. Rebounding assembly 140 includes a support 142 having a proximal end 144 and a distal end 146, a first rebounding member 150, and a second rebounding member 160. First rebounding member 150 is disposed toward proximal end 144 of support 142, between a portion of support 142 and suspension mount engagement member 120. Second rebounding member 160 is disposed toward distal end 146 of support 142, between a portion of support 142 and tire engagement member 130. In some embodiments, first rebounding member 150 is more compressible than second rebounding member 160. When a rebounding assembly or member is compressed, this action can be referred to as jounce. When a rebounding assembly or member subsequently recovers from the compression, and extends, this action can be referred to as rebound. Often, a rebounding assembly or member simultaneously compresses under a load while resisting the compressive force of the load. In this way, a rebounding assembly or member can act as a motion resistance mechanism.

First rebounding member 150 as depicted in FIG. 1A includes a first spring. Similarly, second rebounding member 160 includes a second spring. A spring can be defined as a flexible elastic object which can store potential or mechanical energy. Exemplary springs include coil springs, helical springs, conical springs, torsion springs, volute springs, gas springs, and the like. Typically, a spring becomes shorter when subjected to a load. In some embodiments, first rebounding member 150 includes a first spring having a first spring rate, and second rebounding member 160 includes a second spring having a second spring rate, such that the first spring rate is less than the second spring rate. A spring rate can refer to an amount of force or weight needed to compress a spring a certain distance. For example, a spring can have a spring rate of 100 pounds per centimeter. A spring can have a linear spring rate, where the rate is constant or substantially constant regardless of the load applied to the spring. A spring may also have a progressive rate, where the rate of the spring changes as an increasing load is applied to the spring.

As shown in FIG. 1A, suspension mount engagement member 120 may or may not include an engagement surface 122 for contacting a suspension mount, a steering head, or a fender underside, or any component that is associated with or part of a suspension mount, a steering head, or a fender underside, including without limitation a triple clamp, a double clamp, a fender, a fender bolt, or the like. In some embodiments, the term suspension mount can be used to refer to any one of or any combination of the features mentioned above. In many motorcycles, the suspension mount or steering head encompasses the apparatus which couples the fork with the frame. Engagement surface 122 may be flat or curved, or may have any desired shape so as to ensure or optimize contact between engagement member 120 and the suspension mount. For example, engagement surface 122 may include protuberances 124 such as teeth. Suspension mount engagement member 120 can also include a housing 126 which can contact, contain, or receive proximal end 152 of rebounding member 150. Suspension mount engagement member 120 may also include a trunk 128. Suspension mount engagement member 120 may be independent of, or integral to, support 142. In some embodiments, suspension mount engagement member 120 can be configured to slide or translate longitudinally relative to support 142. In some embodiments, suspension mount engagement member 120 can be fixed with or relative to support 142.

In some embodiments, suspension protection system 100 includes a spacer 170 disposed between first rebounding member 150 and second rebounding member 160. Spacer 170 may be independent of, or integral to, support 142. In some embodiments, spacer 170 can be configured to slide or translate longitudinally within support 142. In some embodiments, spacer 170 can be fixed with or relative to support 142. As shown in FIG. 1A, spacer 170 includes a disk 172. Disk 172 can have a proximal side 172a which can contact a distal end 154 of first rebounding member 150 and a distal side 172b which can contact proximal end 162 of second rebounding member 160. Spacer 170 can also have a housing 174 which can contact, contain, or receive distal end 154 of first rebounding member 150. Suspension protection system 100 can also include a rod or plunger 180 disposed between second rebounding member 160 and tire engagement member 130. Plunger 180 can include a flange 182 which can contact distal end 164 of second rebounding member 160. Plunger 180 can also include a post 184 which can contact tire engagement member 130. Suspension protection system 100 can also include a cap 190 disposed between second rebounding member 160 and tire engagement member 130. Cap 190 can include a seating surface 192 which can contact flange 182 of plunger 180. Cap 190 can also include a housing 194 which can contact, contain, or receive distal end 164 of second rebounding member 160. As shown here, cap 190 includes an aperture 196 which is adapted to receive post 184 of plunger 180 therethrough. Plunger 180, cap 190, or both may be independent of, or integral to, support 142. In some embodiments, plunger 180, cap 190, or both can be configured to slide or translate longitudinally relative to support 142. In some embodiments, plunger 180, cap 190, or both can be fixed with or relative to support 142. Tire engagement member 130 can include a housing 132 and a contact surface 134. Housing 132 can be configured to contact, contain, or receive post 84 of plunger 180. Contact surface 134 can be configured to contact a tire of the vehicle.

FIG. 1B shows an assembled cross section view of suspension protection system 100, in a standard operating configuration. Suspension protection system 100 includes a suspension mount engagement member 120, a tire engagement member 130, and a rebounding assembly 140 coupled between suspension mount engagement member 120 and tire engagement member 130. Suspension mount engagement member 120 is configured to contact a suspension mount of a vehicle and tire engagement member 130 is configured to contact a tire of the vehicle. Rebounding assembly 140 includes a support 142 having a proximal end 144 and a distal end 146, a first rebounding member 150, and a second rebounding member 160. First rebounding member 150 is disposed toward proximal end 144 of support 142, at least partially within a space encompassed by support 142 and suspension mount engagement member 120. Second rebounding member 60 is disposed toward distal end 146 of support 142, at least partially within a space encompassed by support 42 and tire engagement member 130.

First rebounding member 150 as depicted in FIG. 1B includes a first spring. Similarly, second rebounding member 160 includes a second spring. Suspension mount engagement member 120 can include an engagement surface 122 for contacting a suspension mount or a steering head, or a component that is associated with or part of a suspension mount or a steering head. Engagement surface 122 may include protuberances 124 such as teeth. Suspension mount engagement member 120 can also include a housing 126 which can contact, contain, or receive proximal end 152 of rebounding member 150. Suspension mount engagement member 120 may also include a trunk 128. Proximal end 152 of first rebounding member 150 can couple with or otherwise engage trunk 128, so that during use first rebounding member 150 remains seated or aligned with suspension mount engagement member 120.

Suspension protection system 100 can include a spacer 170 disposed between first rebounding member 150 and second rebounding member 160. Spacer 170 may be independent of, or integral to, support 142. As shown in FIG. 1B, spacer 170 includes a disk 172. Disk 172 can have a proximal side 172a which can contact a distal end 154 of first rebounding member 150 and a distal side 172b which can contact proximal end 162 of second rebounding member 160. Spacer 170 can also have a housing 174 which can contact, contain, or receive distal end 54 of first rebounding member 150. Suspension protection system 100 can also include a rod or plunger 180 disposed between second rebounding member 160 and tire engagement member 130. Plunger 180 can include a flange 182 which can contact distal end 164 of second rebounding member 160. Plunger 180 can also include a post 84 which can contact tire engagement member 130. Suspension protection system 100 can also include a cap 190 disposed between second rebounding member 160 and tire engagement member 130. Cap 190 can include a seating surface 192 which can contact flange 182 of plunger 180. Cap 190 can also include a housing 194 which can contact, contain, or receive distal end 164 of second rebounding member 160. As shown here, cap 190 includes an aperture 196 which is adapted to receive post 184 of plunger 180 therethrough. Tire engagement member 130 can include a housing 132 and a contact surface 134. Housing 132 can be configured to contact, contain, or receive post 184 of plunger 180. Contact surface 134 can be configured to contact a tire of the vehicle.

Figures 2A, 2B:
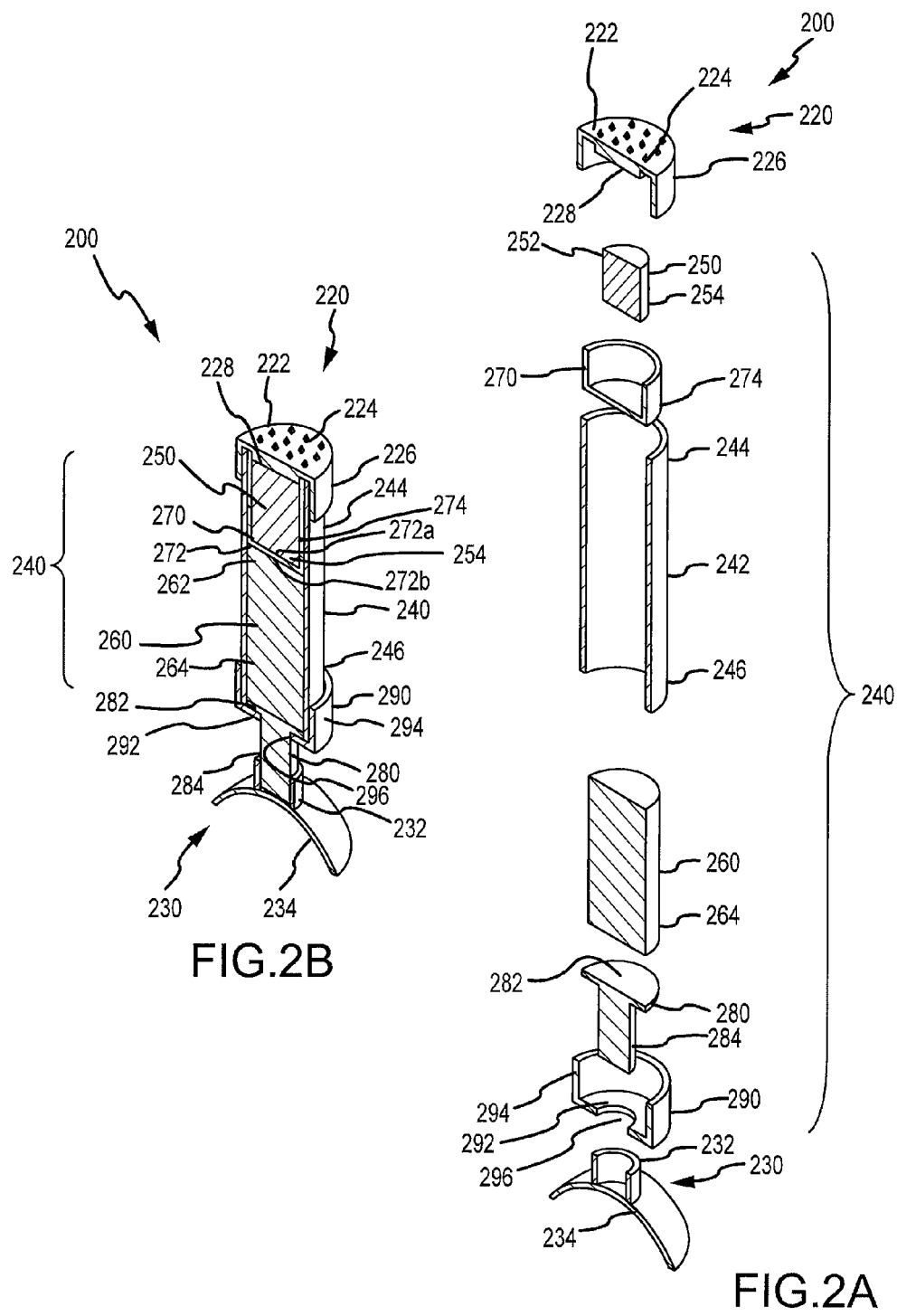
FIGS. 2A and 2B show a suspension protection system according to embodiments of the present invention.

FIG. 2A illustrates an exploded cross section view of a suspension protection system 200. As shown here, suspension protection system 200 includes a suspension mount engagement member 220, a tire engagement member 230, and a rebounding assembly 240 coupled between suspension mount engagement member 220 and tire engagement member 230. Suspension mount engagement member 220 is configured to contact a suspension mount of a vehicle and tire engagement member 230 is configured to contact a tire of the vehicle. Rebounding assembly 240 includes a support 242 having a proximal end 244 and a distal end 246, a first rebounding member 250, and a second rebounding member 260. First rebounding member 250 is disposed toward proximal end 244 of support 242, between support 242 and suspension mount engagement member 220. Second rebounding member 260 is disposed toward distal end 246 of support 242, between support 242 and tire engagement member 230. In some embodiments, first rebounding member 250 is more compressible than second rebounding member 260.

In some cases, a rebounding member can include an elastomeric or rubber material. First rebounding member 250 as depicted in FIG. 2A includes a first elastomer. Similarly, second rebounding member 260 includes a second elastomer. An elastomer can refer to a polymer which resists and recovers from deformation which is produced by a force applied to the polymer. Typically, an elastomer becomes shorter or compressed when subjected to a load. An elastomer may return to its original dimensions after being deformed under an application of mechanical force. In some cases, the terms "elastomer" and "rubber" are used interchangeably, and can refer to natural or synthetic materials, or combinations thereof. An elastomer can be a flexible elastic object which can store potential or mechanical energy. Different elastomers may have different durometers or compressibilities. For example, a first elastomer may have a lower durometer, or a higher compressibility, than a second elastomer. Often, a durometer value or rating is inversely related to a compressibility value or rating. A durometer rating can be a measure of the resistance a material exhibits to deformation. For example, a material having a high durometer, or a low compressibility, may exhibit a greater resistance to deformation when subjected to a load or stress. An elastomer can have a linear compressibility, where the compressibility is constant or substantially constant regardless of the load applied to the elastomer. An elastomer may also have a progressive compressibility, where the compressibility of the elastomer changes as an increasing load is applied to the elastomer. In some embodiments, first rebounding member 250 includes a first elastomer having a first compressibility, and second rebounding member 260 includes a second elastomer having a second compressibility, such that the first compressibility is greater than the second compressibility. In other words, the first elastomer is more compressible than the second elastomer.

As shown in FIG. 2A, suspension mount engagement member 220 can include an engagement surface 222 for contacting a suspension mount or a steering head, or a component that is associated with or part of a suspension mount or a steering head. Engagement surface 222 may be flat or curved, or may have any desired shape so as to ensure or optimize contact between engagement member 220 and the suspension mount. For example, engagement surface 222 may include protuberances 224 such as teeth. Suspension mount engagement member 220 can also include a housing 226 which can contact, contain, or receive proximal end 252 of rebounding member 250. Suspension mount engagement member 220 may also include a trunk 228.

In some embodiments, suspension protection system 200 includes a spacer 270 disposed between first rebounding member 250 and second rebounding member 260. Spacer 270 may be independent of, or integral to, support 242. As shown in FIG. 2A, spacer 270 includes a disk 272. Disk 272 can have a proximal side 272a which can contact a distal end 54 of first rebounding member 250 and a distal side 272b which can contact proximal end 262 of second rebounding member 260. In some embodiments, spacer 270 can be configured to slide or translate longitudinally within support 242. In some embodiments, spacer 270 can be fixed with or relative to support 242. Spacer 270 can also have a housing 274 which can contact, contain, or receive distal end 254 of first rebounding member 250. Suspension protection system 200 can also include a rod or plunger 280 disposed between second rebounding member 260 and tire engagement member 230. Plunger 280 can include a flange 282 which can contact distal end 264 of second rebounding member 260. Plunger 280 can also include a post 284 which can contact tire engagement member 230. Suspension protection system 200 can also include a cap 290 disposed between second rebounding member 260 and tire engagement member 230. Cap 290 can include a seating surface 292 which can contact flange 282 of plunger 280. Cap 290 can also include a housing 294 which can contact, contain, or receive distal end 264 of second rebounding member 260. As shown here, cap 290 includes an aperture 296 which is adapted to receive post 284 of plunger 280 therethrough. Tire engagement member 230 can include a housing 232 and a contact surface 234. Housing 232 can be configured to contact, contain, or receive post 284 of plunger 280. Contact surface 234 can be configured to contact a tire of the vehicle.

FIG. 2B shows an assembled cross section view of suspension protection system 200, in a standard operating configuration. Suspension protection system 200 includes a suspension mount engagement member 220, a tire engagement member 230, and a rebounding assembly 240 coupled between suspension mount engagement member 220 and tire engagement member 230. Suspension mount engagement member 220 is configured to contact a suspension mount of a vehicle and tire engagement member 230 is configured to contact a tire of the vehicle. Rebounding assembly 240 includes a support 242 having a proximal end 244 and a distal end 246, a first rebounding member 250, and a second rebounding member 260. First rebounding member 250 is disposed toward proximal end 244 of support 242, at least partially within a space encompassed by support 242 and suspension mount engagement member 220. Second rebounding member 260 is disposed toward distal end 246 of support 242, at least partially within a space encompassed by support 242 and tire engagement member 230.

First rebounding member 250 as depicted in FIG. 2B includes a first elastomer. Similarly, second rebounding member 260 includes a second elastomer. Suspension mount engagement member 220 can include an engagement surface 222 for contacting a suspension mount or a steering head, or a component that is associated with or part of a suspension mount or a steering head. Engagement surface 222 may include protuberances 224 such as teeth. Suspension mount engagement member 220 can also include a housing 226 which can contact, contain, or receive proximal end 252 of rebounding member 250. Suspension mount engagement member 220 may also include a trunk 228.

Suspension protection system 200 can include a spacer 270 disposed between first rebounding member 250 and second rebounding member 260. Spacer 270 may be independent of, or integral to, support 242. As shown in FIG. 2B, spacer 270 can include a disk 272. Disk 272 can have a proximal side 272a which can contact a distal end 254 of first rebounding member 250 and a distal side 272b which can contact proximal end 262 of second rebounding member 260. Spacer 270 can also have a housing 274 which can contact, contain, or receive distal end 254 of first rebounding member 250. Suspension protection system 200 can also include a rod or plunger 280 disposed between second rebounding member 260 and tire engagement member 230. Plunger 280 can include a flange 282 which can contact distal end 264 of second rebounding member 260. Plunger 280 can also include a post 284 which can contact tire engagement member 230. Suspension protection system 200 can also include a cap 290 disposed between second rebounding member 260 and tire engagement member 230. Cap 290 can include a seating surface 292 which can contact flange 282 of plunger 280. Cap 290 can also include a housing 294 which can contact, contain, or receive distal end 264 of second rebounding member 260. As shown here, cap 290 includes an aperture 296 which is adapted to receive post 284 of plunger 280 therethrough. Tire engagement member 230 can include a housing 232 and a contact surface 234. Housing 232 can be configured to contact, contain, or receive post 284 of plunger 280. Contact surface 234 can be configured to contact a tire of the vehicle.

Figure 3:
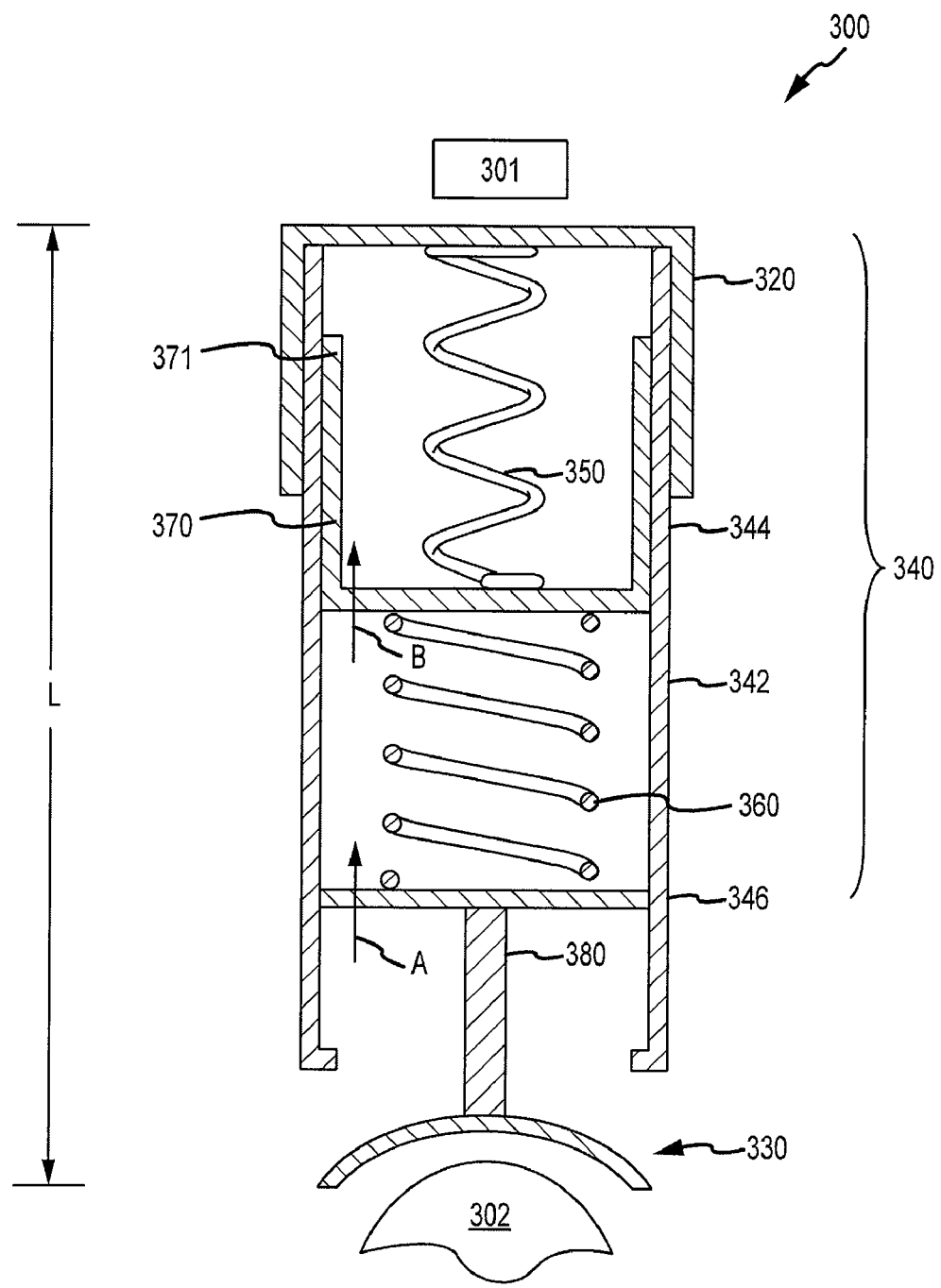
FIG. 3 shows a suspension protection system according to embodiments of the present invention.

FIG. 3 illustrates a mode of operation for a suspension protection system 300 according to embodiments of the present invention. Suspension protection system 300 includes a suspension mount engagement member or fender cap 320, a tire engagement member 330, and a rebounding assembly 340 coupled between suspension mount engagement member 320 and tire engagement member 330. Suspension mount engagement member 320 is configured to contact a suspension mount 301 of a vehicle and tire engagement member 330 is configured to contact a tire 302 of the vehicle. Rebounding assembly 340 can include a support 342 having a proximal end 344 and a distal end 346, a first rebounding member 350, and a second rebounding member 360. As depicted here, first rebounding member 350 is more compressible than second rebounding member 360, and suspension mount engagement member 320 is fixed relative to support 342. For example, first rebounding member 350 can be a light spring, and second rebounding member 360 can be a heavy spring. Rebounding members 350 and 360 can be disposed on opposing sides of spacer 370, which may in some cases include a disk constructed of metal or some other desired material.

In use or as part of an installation procedure, an operator can apply or increase a compressive force to system 300. For example, an operator can urge suspension mount engagement member 320 and tire engagement member or saddle 330 toward each other, or otherwise cause plunger 380 to translate relative to support or cylinder 342 as indicated by arrow A, so as to compress first rebounding member 350. In this way, a light spring can provide for easy compression by hand. Such action shortens the overall length L of suspension protection system 300, and is accompanied by translational movement of spacer 370 relative to support 342 as indicated by arrow B. As shown here, after first rebounding member 350 compresses a certain amount, a proximal portion 371 of spacer 370 can contact suspension mount engagement member 320, so as to prevent or inhibit further compression of first rebounding member 350. When length L is shortened or adjusted sufficiently or as desired by the operator, the operator can place suspension protection system 300 between suspension mount or fender 301 and tire 302. The operator can then release or reduce the compressive force to system 300, so as to allow first rebounding member 350 to lengthen. This action is accompanied by movement of spacer 370 and plunger 380 relative to support 342, in the direction opposite of arrows B and A, respectively, so that length L of system 300 increases until suspension mount engagement member 320 contacts suspension mount 301, and tire engagement member 330 contacts tire 302. In this way, system 300, which may be a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, suspension mount 301 and tire 302 are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, system 300 can be compressed such that first rebounding member 350 is shortened and spacer 370 contacts suspension mount engagement member 320. As additional cinching force is applied, spacer 370 can no longer move in the directed indicated by arrow B, but plunger 380 can continue to move in the direction indicated by arrow A, and second rebounding member 360 can therefore compress and length L of system 300 can be further reduced. In this way, a heavy spring can take the significant load associated with tightening a motorcycle to a trailer or truck bed. Due to the relatively low compressibility of second rebounding member 360, system 300 can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, system 300 can also prevent the suspension of the motorcycle from becoming subject to unwanted levels of compression, and can also maintain tautness in the cinching devices. For example, during such compressive events, plunger 380 can continue to move in the direction indicated by arrow A, and second rebounding member 360 can therefor compress and length L of system 300 can be further reduced. Relatedly, when transient compressive events are completed or diminished, plunger 380 can then move in a direction opposite of the direction indicated by arrow A, and second rebounding member 360 can therefor expand and length L of system 300 can be increased.

Figure 4:
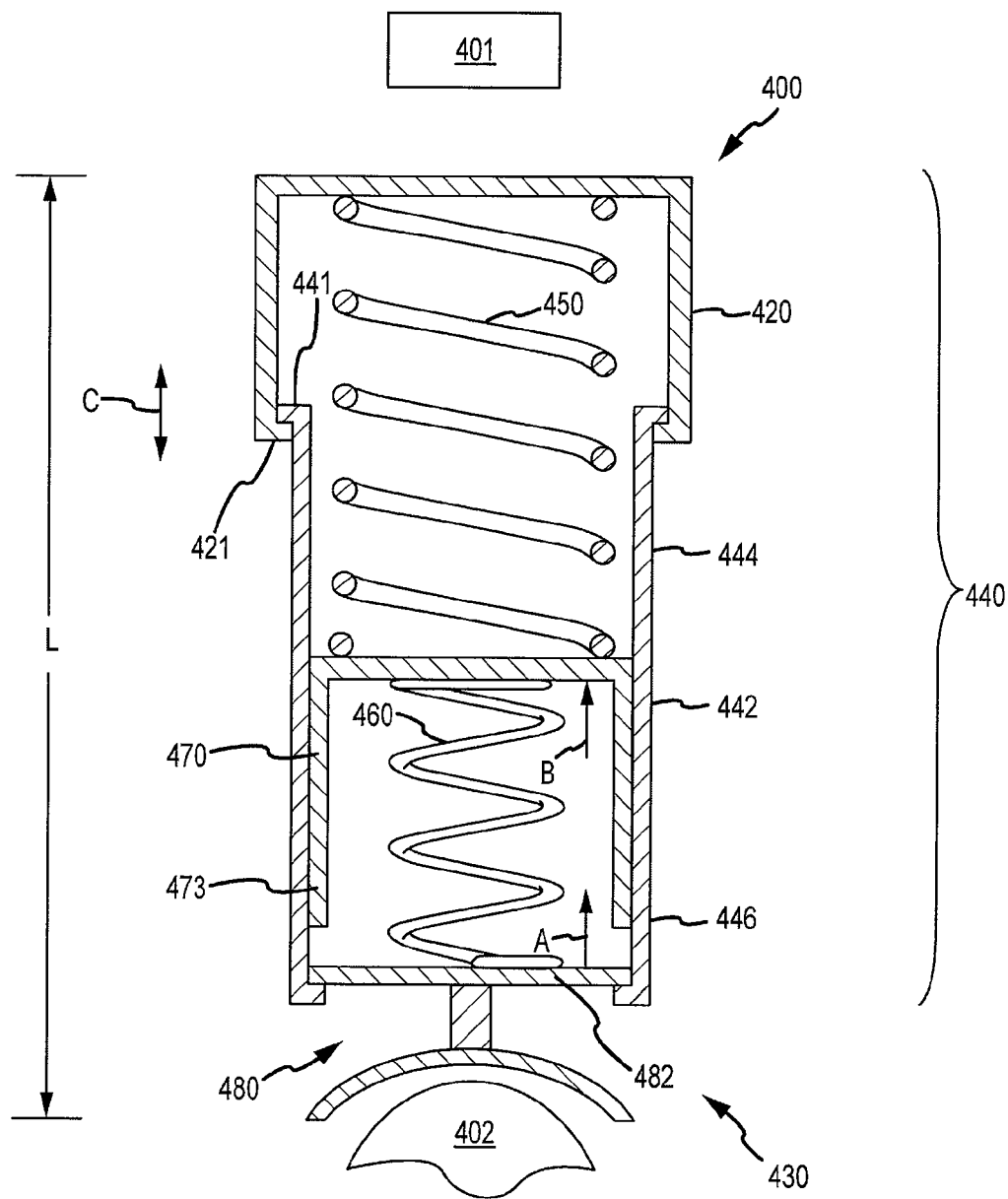
FIG. 4 shows a suspension protection system according to embodiments of the present invention.

FIG. 4 illustrates a mode of operation for a suspension protection system 400 according to embodiments of the present invention. Suspension protection system 400 includes a suspension mount engagement member or fender cap 420, a tire engagement member 430, and a rebounding assembly 440 coupled between suspension mount engagement member 420 and tire engagement member 430. Suspension mount engagement member 420 is configured to contact a suspension mount 401 of a vehicle and tire engagement member 430 is configured to contact a tire 402 of the vehicle. Rebounding assembly 440 includes a support 442 having a proximal end 444 and a distal end 446, a first rebounding member 450, and a second rebounding member 460. As depicted here, first rebounding member 450 is less compressible than second rebounding member 360. Suspension mount engagement member 420 can be fixed relative to support 442, or suspension mount engagement member 420 can be free to translate longitudinally or otherwise move relative to support 442, as indicated by arrow C. Suspension mount engagement member 420 can include a stop 421 and support 442 can include a stop 441, wherein stop 421 and stop 442 are configured to contact each other. First rebounding member 450 can be a heavy spring, and second rebounding member 460 can be a light spring. Rebounding members 450 and 460 can be disposed on opposing sides of spacer 470, which may in some cases include a disk constructed of metal or some other desired material.

In use or as part of an installation procedure, an operator can apply or increase a compressive force to system 400. For example, an operator can urge suspension mount engagement member 420 and tire engagement member or saddle 430 toward each other, or otherwise cause plunger 480 to translate relative to support or cylinder 442 as indicated by arrow A, so as to compress second rebounding member 460. In this way, a light spring can provide for easy compression by hand. Such action shortens the overall length L of suspension protection system 400. As shown here, after second rebounding member 460 compresses a certain amount, a distal portion 473 of spacer 470 can contact flange 482 of plunger 480, so as to prevent or inhibit further compression of second rebounding member 460. When length L is shortened or adjusted sufficiently or as desired by the operator, the operator can place suspension protection system 400 between suspension mount or fender 401 and tire 402. The operator can then release or reduce the compressive force to system 400, so as to allow second rebounding member 460 to lengthen. This action is accompanied by movement of plunger 480 relative to support 442, in the direction opposite of arrow A, respectively, so that length L of system 400 increases until suspension mount engagement member 420 contacts suspension mount 401, and tire engagement member 430 contacts tire 402. In this way, system 400, which may be a motorcycle suspension or fork protection system, can be installed on a vehicle such as a motorcycle by hand and remain in place as the tie-down straps are attached to the motorcycle and cinched.

The operator can then strap down or otherwise secure the vehicle with a transport surface, such as a trailer, a truck bed, or the like. Typically, when the vehicle is secured to the transport surface, suspension mount 401 and tire 402 are forced or pressed toward each other. For example, an operator may couple one end of a cinching device to a first (e.g. right) handlebar of a motorcycle and the other end of the cinching device to the floor of a truck bed, and then actuate the cinching device to firmly secure the motorcycle to the truck bed. A second cinching device can be attached a second (e.g. left) handlebar and the truck bed floor in a similar fashion. By attaching cinching devices or straps to the motorcycle and floor, system 400 can be compressed such that second rebounding member 460 is shortened and spacer 470 contacts flange 482 or some other portion of plunger 480. As additional cinching force is applied, plunger 480 can no longer move relative to spacer 470, but in combination both spacer 470 and plunger 480 can move in the direction indicated by arrows B and A, respectively. This movement compresses first rebounding member 450 and length L of system 400 can be further reduced. In this way, a heavy spring can take the significant load associated with tightening a motorcycle to a trailer or truck bed. Due to the relatively low compressibility of first rebounding member 450, system 400 can protect the suspension system of the motorcycle which would otherwise absorb the compressive load or a portion thereof which results from cinching, strapping, or fastening to the transport surface.

During transport, as the motorcycle is subject to compressive forces such as travel over bumpy roads, braking, and cornering events, system 400 can also prevent the suspension of the motorcycle from becoming subject to unwanted levels of compression. For example, during such compressive events, plunger 480 and spacer 470 can continue to move in the direction indicated by arrows A and B, respectively, and first rebounding member 450 can therefore compress and length L of system 400 can be further reduced. Conversely, when transient compressive events are completed or diminished, plunger 480 and spacer 470 can then move in a direction opposite of the direction indicated by arrows A and B, respectively, and first rebounding member 450 can therefore expand and length L of system 400 can be increased.

Figures 5, 6:
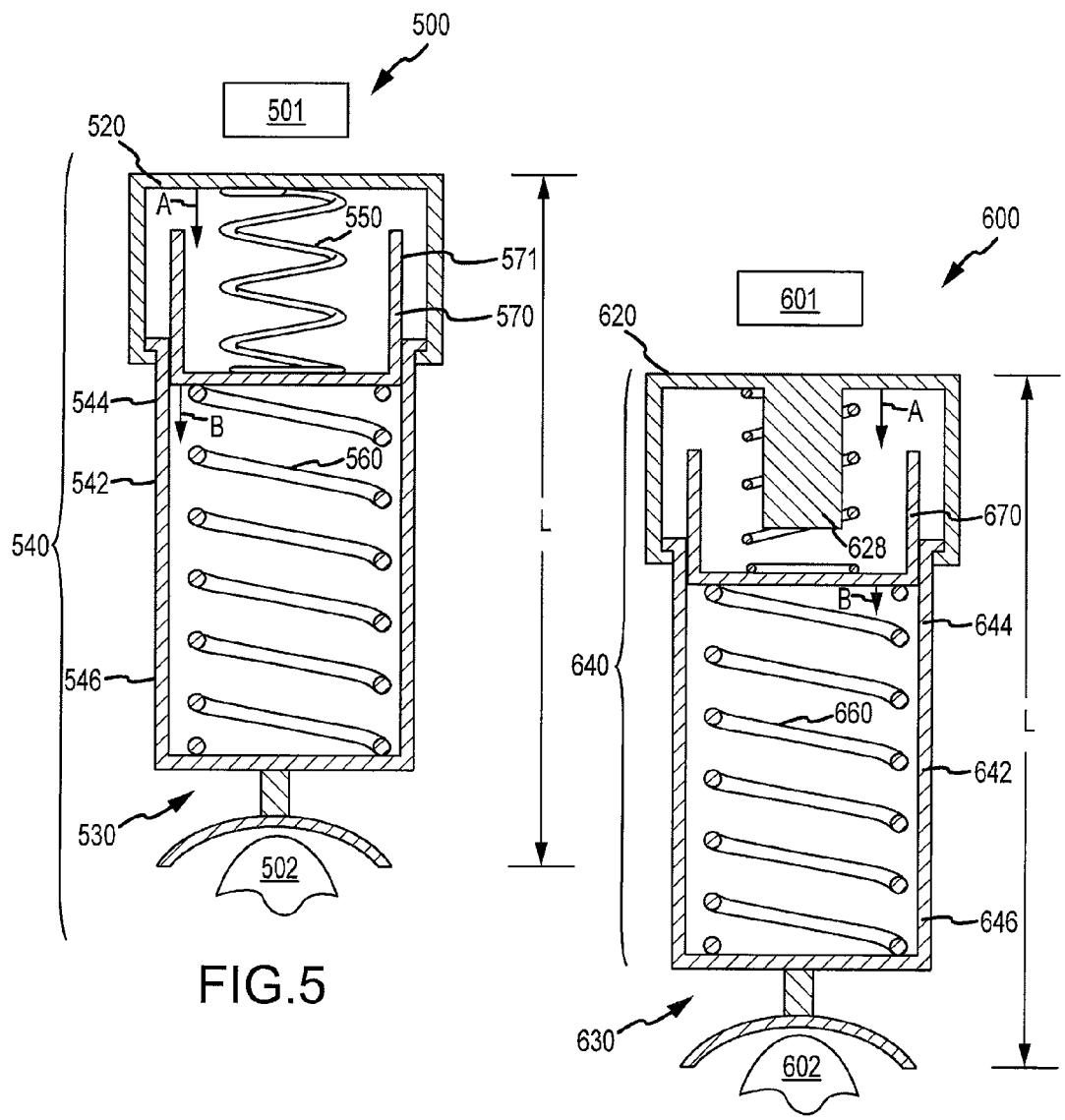
FIG. 5 shows a suspension protection system according to embodiments of the present invention.
FIG. 6 shows a suspension protection system according to embodiments of the present invention.

FIG. 5 illustrates a mode of operation for a suspension protection system 500 according to embodiments of the present invention. Suspension protection system 500 includes a suspension mount engagement member or fender cap 520, a tire engagement member 530, and a rebounding assembly 540 coupled between suspension mount engagement member 520 and tire engagement member 530. Suspension mount engagement member 520 is configured to contact a suspension mount 501 of a vehicle and tire engagement member 530 is configured to contact a tire 502 of the vehicle. Rebounding assembly 540 includes a support 542 having a proximal end 544 and a distal end 546, a first rebounding member 550, and a second rebounding member 560. As depicted here, first rebounding member 550 is more compressible than second rebounding member 560, and suspension mount engagement member 520 is configured to move relative to support 542. For example, first rebounding member 550 can be a light spring, and second rebounding member 560 can be a heavy spring. Rebounding members 550 and 560 can be disposed on opposing sides of spacer 570, which may in some cases include a disk constructed of metal or some other desired material.

In use or as part of an installation procedure, an operator can apply or increase a compressive force to system 500. For example, an operator can urge suspension mount engagement member 520 and tire engagement member or saddle 530 toward each other, or otherwise cause suspension mount engagement member 520 to translate relative to support or cylinder 542 as indicated by arrow A, so as to compress first rebounding member 550. In this way, a light spring can provide for easy compression by hand. Such action shortens the overall length L of suspension protection system 500. As shown here, after first rebounding member 550 compresses a certain amount, a proximal portion 571 of spacer 570 can contact suspension mount engagement member 520, so as to prevent or inhibit further compression of first rebounding member 550. When length L is shortened or adjusted sufficiently or as desired by the operator, the operator can place suspension protection system 500 between suspension mount or fender 501 and tire 502. The operator can then release or reduce the compressive force to system 500, so as to allow first rebounding member 550 to lengthen. This action is accompanied by movement of suspension mount engagement member 520 relative to support 542, in the direction opposite of arrow A, so that length L of system 500 increases until suspension mount engagement member 520 contacts suspension mount 501, and tire engagement member 530 contacts tire 502. In this way, system 500, which may be a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, suspension mount 501 and tire 502 are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, system 500 can be compressed such that first rebounding member 550 is shortened and spacer 570 contacts suspension mount engagement member 520. As additional cinching force is applied, suspension mount engagement member 520 can no longer move relative to spacer 570 in the directed indicated by arrow A, but in combination suspension mount engagement member 520 and spacer 570 can move in the direction indicated by arrows A and B, respectively, relative to support 542. Hence, second rebounding member 560 can compress and length L of system 500 can be further reduced. In this way, a heavy spring can take the significant load associated with tightening a motorcycle to a trailer or truck bed. Due to the relatively low compressibility of second rebounding member 560, system 500 can protect the suspension system of the motorcycle which would otherwise absorbs the compressive load or a portion thereof which results from cinching or strapping to the transport surface.

During transport, as the motorcycle is subject to compressive forces such as travel over bumpy roads, braking, and cornering events, system 500 can also prevent the suspension of the motorcycle from becoming subject to unwanted levels of compression. For example, during such compressive events, suspension mount engagement member 520 and spacer 570 can continue to move in the direction indicated by arrows A and B, and second rebounding member 560 can therefore compress and length L of system 500 can be further reduced. Conversely, when transient compressive events are completed or diminished, suspension mount engagement member 520 and spacer 570 can then move in a direction opposite of the direction indicated by arrows A and B, and second rebounding member 560 can therefor expand and length L of system 500 can be increased.

FIG. 6 illustrates a mode of operation for a suspension protection system 600 according to embodiments of the present invention. Suspension protection system 600 includes a suspension mount engagement member or fender cap 620, a tire engagement member 630, and a rebounding assembly 640 coupled between suspension mount engagement member 620 and tire engagement member 630. Suspension mount engagement member 620 is configured to contact a suspension mount 601 of a vehicle and tire engagement member 630 is configured to contact a tire 602 of the vehicle. Rebounding assembly 640 includes a support 642 having a proximal end 644 and a distal end 646, a first rebounding member 650, and a second rebounding member 660. As depicted here, first rebounding member 650 is more compressible than second rebounding member 660, and suspension mount engagement member 620 is configured to move relative to support 642. For example, first rebounding member 650 can be a light spring, and second rebounding member 660 can be a heavy spring. Rebounding members 650 and 660 can be disposed on opposing sides of spacer 670, which may in some cases include a disk constructed of metal or some other desired material.

In use or as part of an installation procedure, an operator can apply or increase a compressive force to system 600. For example, an operator can urge suspension mount engagement member 620 and tire engagement member or saddle 630 toward each other, or otherwise cause suspension mount engagement member 620 to translate relative to support or cylinder 642 as indicated by arrow A, so as to compress first rebounding member 650. In this way, a light spring can provide for easy compression by hand. Such action shortens the overall length L of suspension protection system 600. As shown here, after first rebounding member 650 compresses a certain amount, spacer 670 can contact a trunk 628 of suspension mount engagement member 620, whereby further compression of first rebounding member 650 is prevented or inhibited. When length L is shortened or adjusted sufficiently or as desired by the operator, the operator can place suspension protection system 600 between suspension mount or fender 601 and tire 602. The operator can then release or reduce the compressive force to system 600, so as to allow first rebounding member 650 to lengthen. This action is accompanied by movement of suspension mount engagement member 620 relative to support 642, in the direction opposite of arrow A, so that length L of system 600 increases until suspension mount engagement member 620 contacts suspension mount 601, and tire engagement member 630 contacts tire 602. In this way, system 600, which may be a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, suspension mount 601 and tire 602 are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, system 600 can be compressed such that first rebounding member 650 is shortened and spacer 670 contacts trunk 628 of suspension mount engagement member 620. As additional cinching force is applied, suspension mount engagement member 620 can no longer move relative to spacer 670 in the directed indicated by arrow A, but in combination suspension mount engagement member 620 and spacer 670 can move in the direction indicated by arrows A and B, respectively, relative to support 642. Hence, second rebounding member 660 can compress and length L of system 600 can be further reduced. In this way, a heavy spring can take the significant load associated with tightening a motorcycle to a trailer or truck bed. Due to the relatively low compressibility of second rebounding member 660, system 600 can protect the suspension system of the motorcycle which would otherwise absorbs the compressive load or a portion thereof which results from cinching or strapping to the transport surface.

During transport, as the motorcycle is subject to compressive forces such as travel over bumpy roads, braking, and cornering events, system 600 can also prevent the suspension of the motorcycle from becoming subject to unwanted levels of compression. For example, during such compressive events, suspension mount engagement member 620 and spacer 670 can continue to move in the direction indicated by arrows A and B, and second rebounding member 660 can therefore compress and length L of system 600 can be further reduced. Conversely, when transient compressive events are completed or diminished, suspension mount engagement member 620 and spacer 670 can then move in a direction opposite of the direction indicated by arrows A and B, and second rebounding member 660 can therefore expand and length L of system 600 can be increased.

Figure 7:
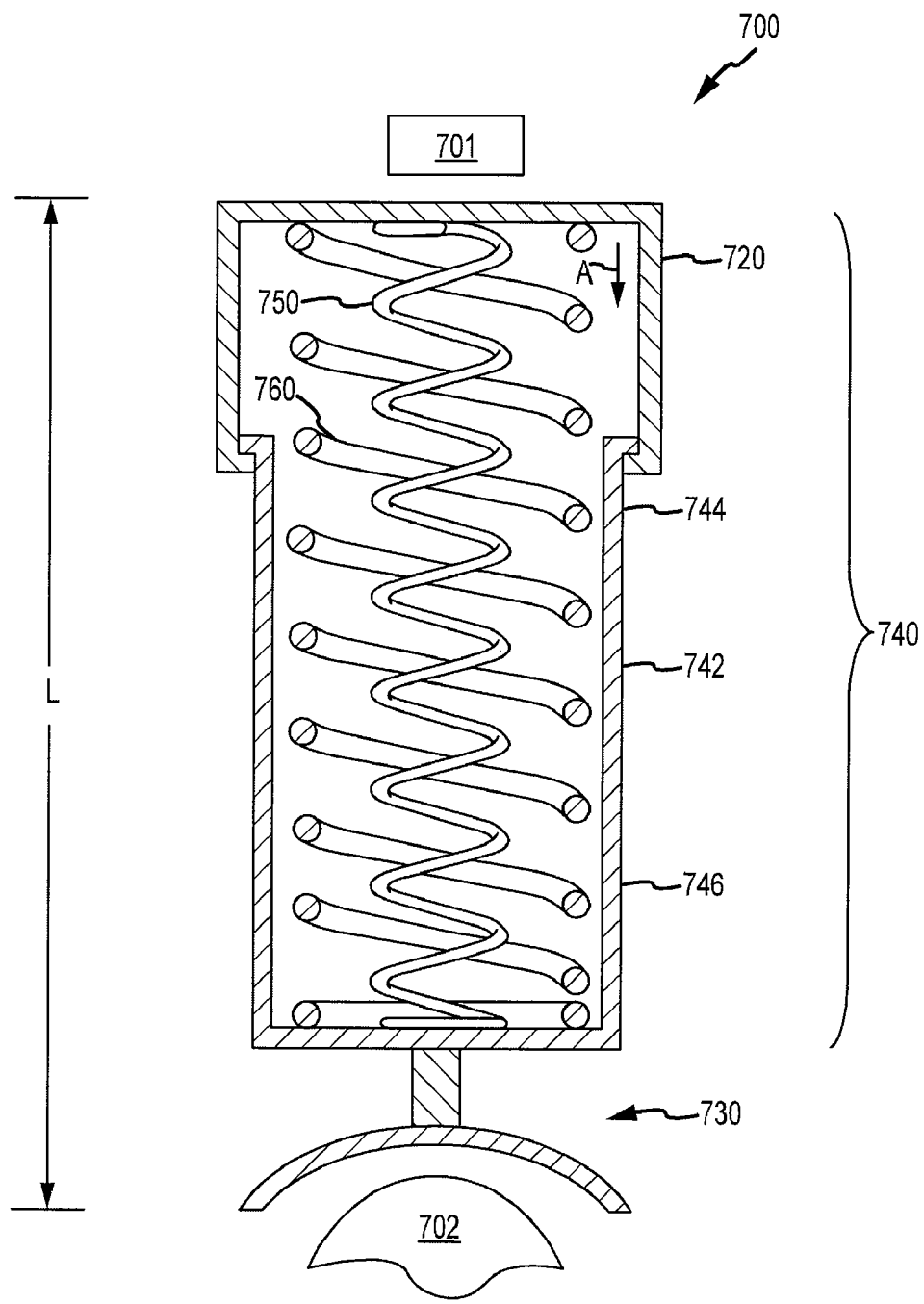
FIG. 7 shows a suspension protection system according to embodiments of the present invention.

FIG. 7 illustrates a mode of operation for a suspension protection system 700 according to embodiments of the present invention. Suspension protection system 700 includes a suspension mount engagement member or fender cap 720, a tire engagement member 730, and a rebounding assembly 740 coupled between suspension mount engagement member 720 and tire engagement member 730. Suspension mount engagement member 720 is configured to contact a suspension mount 701 of a vehicle and tire engagement member 730 is configured to contact a tire 702 of the vehicle. Rebounding assembly 740 includes a support 742 having a proximal end 744 and a distal end 746, a first rebounding member 750, and a second rebounding member 760. As depicted here, first rebounding member 750 is more compressible than second rebounding member 760, and suspension mount engagement member 720 is configured to move relative to support 742. For example, first rebounding member 750 can be a light spring, and second rebounding member 760 can be a heavy spring.

In use or as part of an installation procedure, an operator can apply or increase a compressive force to system 700. For example, an operator can urge suspension mount engagement member 720 and tire engagement member or saddle 730 toward each other, or otherwise cause suspension mount engagement member 720 to translate relative to support or cylinder 742 as indicated by arrow A, so as to compress first rebounding member 750. In this way, a light spring can provide for easy compression by hand. Such action shortens the overall length L of suspension protection system 700. As shown here, after first rebounding member 750 compresses a certain amount, suspension mount engagement member 720 can contact a proximal end of second rebounding member 760, such that upon application of additional compressive force to system 700, further compression of first rebounding member 750 is accompanied by compression of second rebounding member 760. In some cases second rebounding member 760 will have a sufficiently low compressibility such that the combined compression may be difficult to achieve manually. When length L is shortened or adjusted sufficiently or as desired by the operator, the operator can place suspension protection system 700 between suspension mount or fender 701 and tire 702. The operator can then release or reduce the compressive force to system 700, so as to allow first rebounding member 750 to lengthen. This action is accompanied by movement of suspension mount engagement member 720 relative to support 742, in the direction opposite of arrow A, so that length L of system 700 increases until suspension mount engagement member 720 contacts suspension mount 701, and tire engagement member 730 contacts tire 702. In this way, system 700, which may be a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, suspension mount 701 and tire 702 are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, system 700 can be compressed such that first rebounding member 750 is shortened and suspension mount engagement member 720 contacts second rebounding member 760. As additional cinching force is applied, suspension mount engagement member 720 continues to move relative to support 742 in the directed indicated by arrow A, and both first rebounding member 750 and second rebounding member 760 compress simultaneously or in combination. Hence, length L of system 700 can be further reduced. In this way, a heavy spring, and to a lesser degree the light spring, can take the significant load associated with tightening a motorcycle to a trailer or truck bed. Due to the relatively low compressibility of second rebounding member 760, system 700 can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, system 700 can also prevent the suspension of the motorcycle from becoming subject to unwanted levels of compression. For example, during such compressive events, suspension mount engagement member 720 can continue to move in the direction indicated by arrow A, and first and second rebounding members 750, 760 can therefore compress and length L of system 700 can be further reduced. Conversely, when transient compressive events are completed or diminished, suspension mount engagement member 720 can then move in a direction opposite of the direction indicated by arrow A, and first and second rebounding members 750, 760 can therefore expand and length L of system 700 can be increased.

Figure 8:
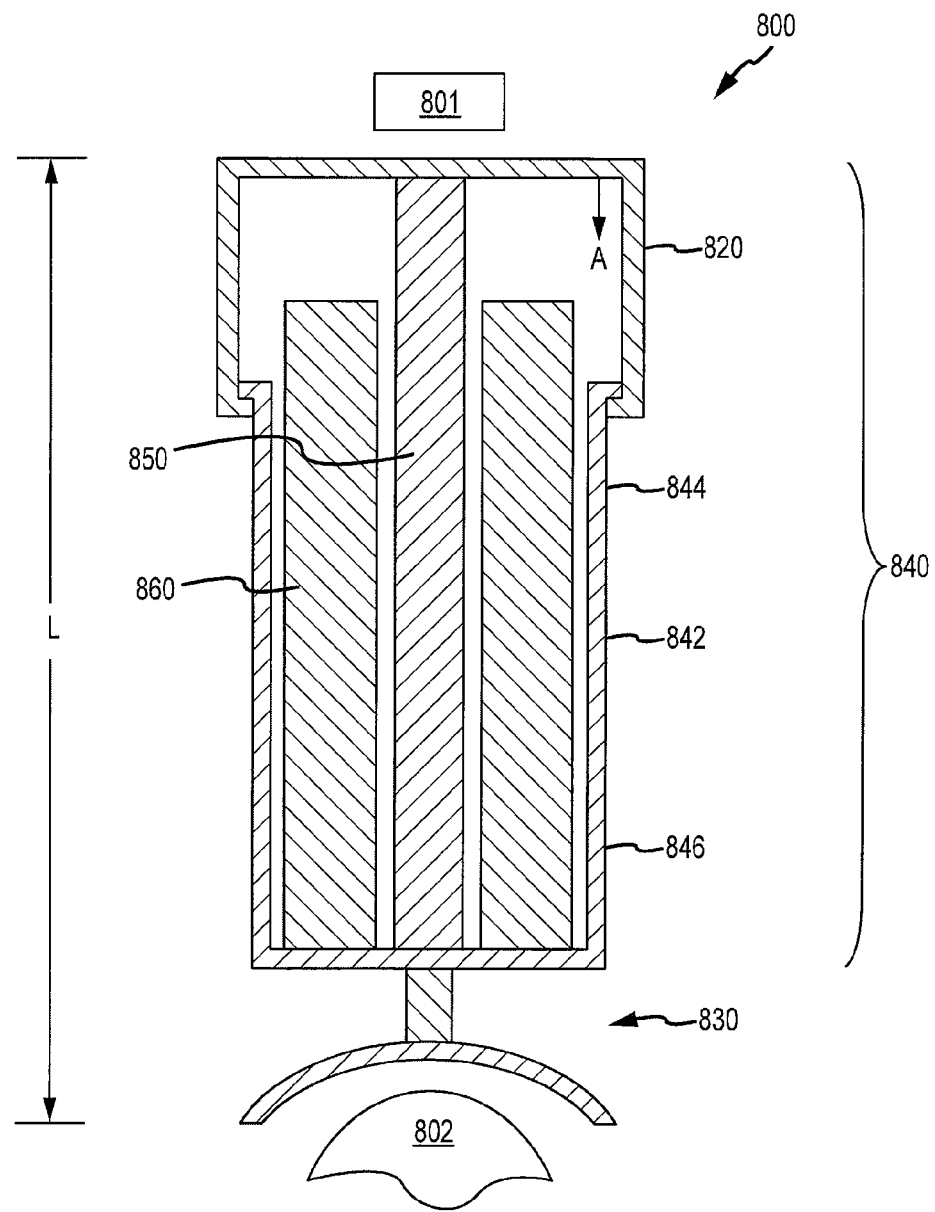
FIG. 8 shows a suspension protection system according to embodiments of the present invention.

FIG. 8 illustrates a mode of operation for a suspension protection system 800 according to embodiments of the present invention. Suspension protection system 800 includes a suspension mount engagement member or fender cap 820, a tire engagement member 830, and a rebounding assembly 840 coupled between suspension mount engagement member 820 and tire engagement member 830. Suspension mount engagement member 820 is configured to contact a suspension mount 801 of a vehicle and tire engagement member 830 is configured to contact a tire 802 of the vehicle. Rebounding assembly 840 includes a support 842 having a proximal end 844 and a distal end 846, a first rebounding member 850, and a second rebounding member 860. As depicted here, first rebounding member 850 is more compressible than second rebounding member 860, and suspension mount engagement member 820 is configured to move relative to support 842. For example, first rebounding member 850 can be a cylindrical elastomer member having a first compressibility rating, and second rebounding member 860 can be a cylindrical elastomer member having a second compressibility rating, wherein the first compressibility rating is higher than the second compressibility rating. As shown here, first rebounding member 850 is concentrically disposed within an interior lumen of second rebounding member 860. It is understood that in addition to presenting a circular cross-section, a rebounding member may also present a non-circular cross-section. Hence, embodiments of the present invention encompass rebounding members having any of a variety of desired shapes.

In use or as part of an installation procedure, an operator can apply or increase a compressive force to system 800. For example, an operator can urge suspension mount engagement member 820 and tire engagement member or saddle 830 toward each other, or otherwise cause suspension mount engagement member 820 to translate relative to support or cylinder 842 as indicated by arrow A, so as to compress first rebounding member 850. In this way, an elastomer having a low durometer can provide for easy compression by hand. Such action shortens the overall length L of suspension protection system 800. As shown here, after first rebounding member 850 compresses a certain amount, suspension mount engagement member 820 can contact a proximal end of second rebounding member 860, such that upon application of additional compressive force to system 800, further compression of first rebounding member 850 is accompanied by compression of second rebounding member 860. In some cases second rebounding member 860 will have a sufficiently low compressibility such that the combined compression may be difficult to achieve manually. When length L is shortened or adjusted sufficiently or as desired by the operator, the operator can place suspension protection system 800 between suspension mount or fender 801 and tire 802. The operator can then release or reduce the compressive force to system 800, so as to allow first rebounding member 850 to lengthen. This action is accompanied by movement of suspension mount engagement member 820 relative to support 842, in the direction opposite of arrow A, so that length L of system 800 increases until suspension mount engagement member 820 contacts suspension mount 801, and tire engagement member 830 contacts tire 802. In this way, system 800, which may be a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, suspension mount 801 and tire 802 are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, system 800 can be compressed such that first rebounding member 850 is shortened and suspension mount engagement member 820 contacts second rebounding member 860. As additional cinching force is applied, suspension mount engagement member 820 continues to move relative to support 842 in the directed indicated by arrow A, and both first rebounding member 850 and second rebounding member 860 compress simultaneously or in combination. Hence, length L of system 800 can be further reduced. In this way, a heavy spring, and to a lesser degree the light spring, can take the significant load associated with tightening a motorcycle to a trailer or truck bed. Due to the relatively low compressibility of second rebounding member 860, system 800 can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, system 800 can also prevent the suspension of the motorcycle from becoming subject to unwanted levels of compression. For example, during such compressive events, suspension mount engagement member 820 can continue to move in the direction indicated by arrow A, and first and second rebounding members 850, 860 can therefore compress and length L of system 800 can be further reduced. Conversely, when transient compressive events are completed or diminished, suspension mount engagement member 820 can then move in a direction opposite of the direction indicated by arrow A, and first and second rebounding members 850, 860 can therefore expand and length L of system 800 can be increased.

Figure 9:
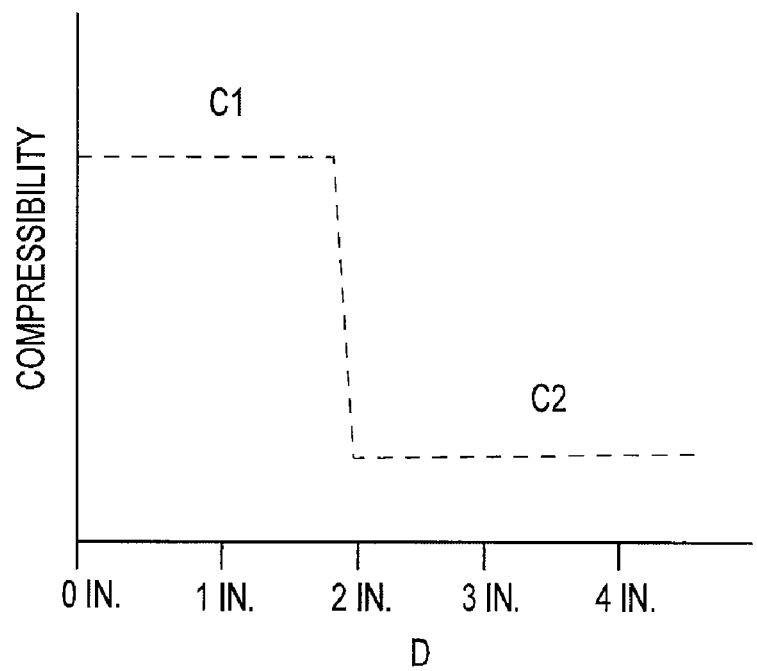
FIG. 9 illustrates a compressibility profile of a suspension protection system according to embodiments of the present invention.

FIG. 9 illustrates a compressibility profile of a suspension protection system according to embodiments of the present invention. As shown here, the suspension protection system provides a first compressibility C1 corresponding to a compression distance D within a range from about 0 inches to about 2 inches. Thus, as an operator manually applies a first compressive force to the system, the system reduces in length by a distance of up to 2 inches. Typically, the first compressibility C1 is relatively high, such that the system can be easily compressed. After the system is compressed 2 inches, the system provides a second compressibility C2 corresponding to a compression distance D of about 2 inches or greater. Typically, the second compressibility C2 is relatively low, such that the system can compress under force, but at the same time provide resistance to the compression sufficient to protect the suspension system of a vehicle from unwanted compression or overcompression.

Thus, in an exemplary installation procedure, an operator can manually compress the system to a compression distance of about 2 inches during which time the system provides a high compressibility C1, place the system between a suspension mount and a tire of a vehicle, allow the system to expand to a compression distance of about 1 inch such that the suspension mount engagement member contacts the suspension mount and the tire engagement member contacts the tire, and cinch the vehicle to the transport surface so as to compress the system to a compression distance of about 3 inches. Thereafter, the vehicle can be transported and the system can provide compressibility C2 so as to protect the suspension system of the vehicle.

Figure 10:
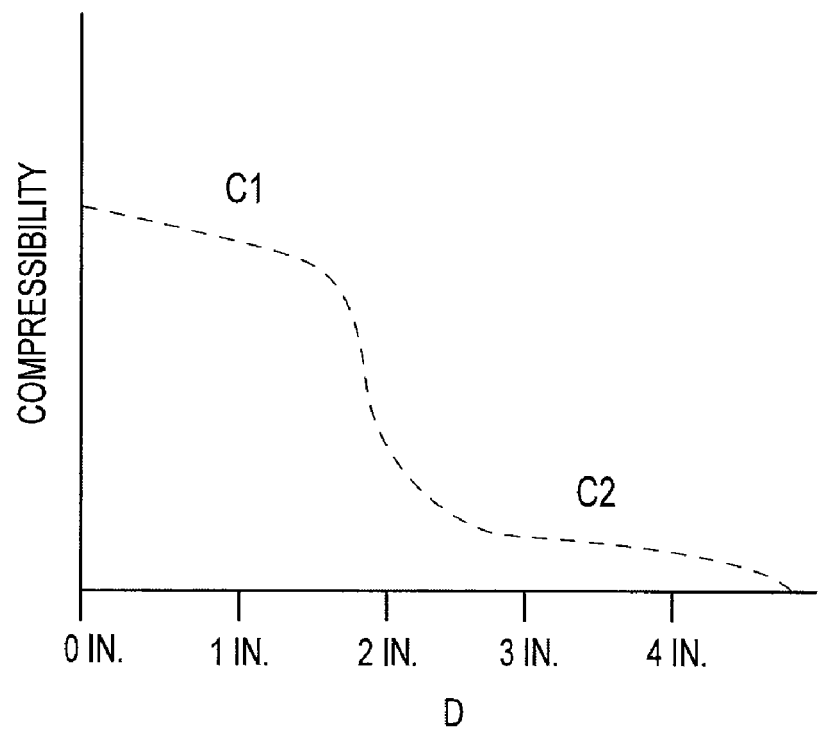
FIG. 10 illustrates a compressibility profile of a suspension protection system according to embodiments of the present invention.

FIG. 10 illustrates a compressibility profile of a suspension protection system according to embodiments of the present invention. As shown here, the suspension protection system provides a first compressibility curve C1 corresponding to a compression distance D within a range from about 0 inches to about 2 inches. Thus, as an operator manually applies a first compressive force or force range to the system, the system reduces in length by a distance of up to 2 inches. Typically, the first compressibility curve C1 encompasses a relatively high compressibility, such that the system can be easily compressed. After the system is compressed 2 inches, the system provides a second compressibility curve C2 corresponding to a compression distance D of about 2 inches or greater. Typically, the second compressibility curve C2 encompasses a relatively low compressibility, such that the system can compress under force, but at the same time provide resistance to the compression sufficient to protect the suspension system of a vehicle from unwanted compression or overcompression.

Figure 11:
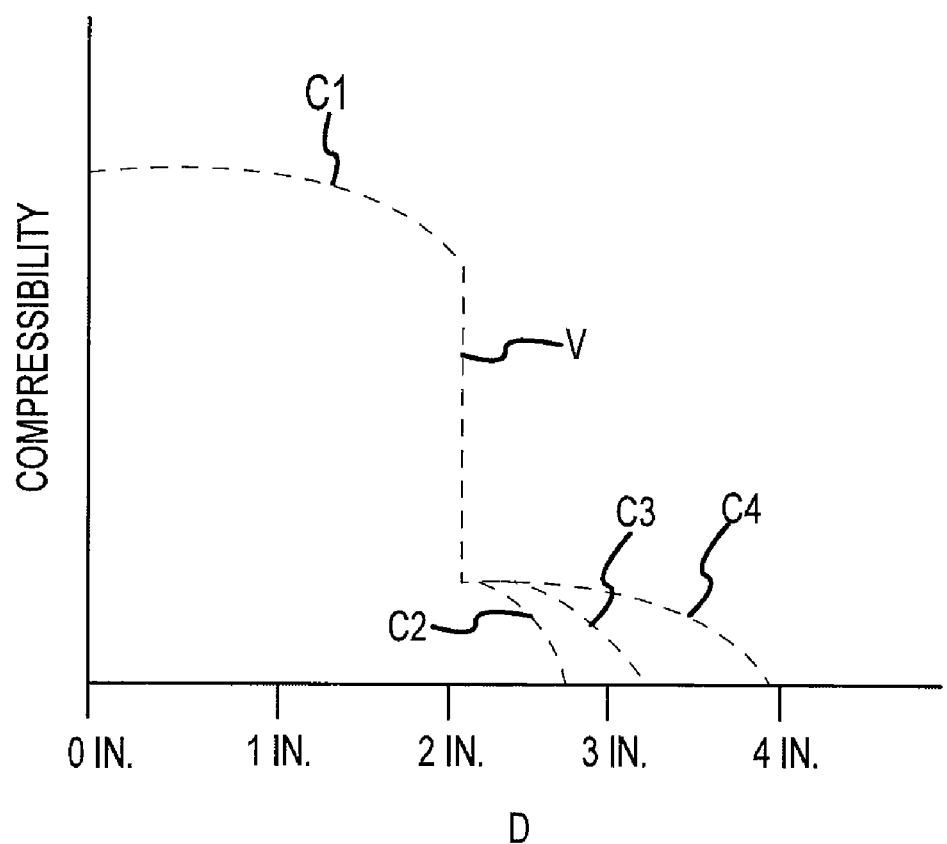
FIG. 11 illustrates exemplary compressibility profiles suspension protection systems according to embodiments of the present invention.

FIG. 11 illustrates possible compressibility profiles of suspension protection systems according to embodiments of the present invention. As shown here, a suspension protection system can provides a first compressibility curve C1 corresponding to a compression distance D within a range from about 0 inches to about 2 inches. Thus, as an operator manually applies a first compressive force or force range to the system, the system reduces in length by a distance of up to 2 inches. Typically, the first compressibility curve C1 encompasses a relatively high compressibility, such that the system can be easily compressed. After the system is compressed 2 inches, the system can provide a second compressibility curve C2, a third compressibility curve C3, or a fourth compressibility curve C4, corresponding to a compression distance D of about 2 inches or greater. Typically, the second, third, or fourth compressibility curve C2, C3, or C4, respectively, encompasses a relatively low compressibility, such that the system can compress under force, but at the same time provide resistance to the compression sufficient to protect the suspension system of a vehicle from unwanted compression or overcompression. The intermediate portion of the compressibility profile, here shown by vertical line V, corresponds to a transition configuration of the suspension protection system, beyond which the less compressible rebounding member, for example, becomes engaged or activated.

Figures 12A, 12B:
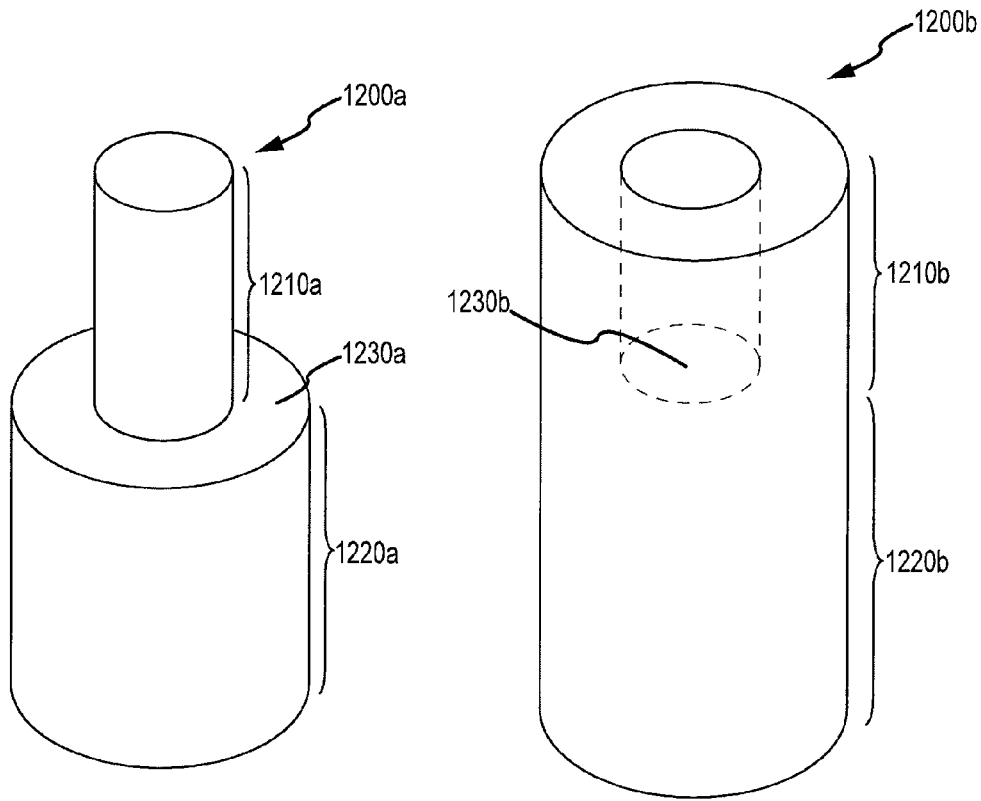
FIGS. 12A and 12B show rebounding members according to embodiments of the present invention.

FIGS. 12A and 12B show single element rebounding members for use with suspension protection systems according to embodiments of the present invention. Such single element rebounding members can provide a system protection system with a variable compressibility profile. As shown in FIG. 12A, rebounding member 1200*a* includes a first rebounding member section 1210*a* and a second rebounding member section 1220*a*. As depicted here, first rebounding member section 1210*a* is more compressible than second rebounding member section 1220*a*. For example, first rebounding member section 1210*a* can be a cylindrical elastomer portion having a first compressibility rating, and second rebounding member section 1220*a* can be a cylindrical elastomer portion having a second compressibility rating, wherein the first compressibility rating is higher than the second compressibility rating. A rebounding member compressibility rating may depend on any of a variety of factors. For example, certain materials are more compressible than others, and therefore the material composition of a rebounding member can effect the compressibility rating. Relatedly, the compressibility of a rebounding member may be a function of the volume of the rebounding member. In some cases, the compressibility of a rebounding member may be increased by introducing or creating voids in the rebounding member, or by decreasing the mass of material contained in the rebounding member.

In use or as part of an installation procedure, an operator can apply or increase a compressive force to a suspension protection system that includes rebounding member 1200*a*. For example, an operator can urge a suspension mount engagement member and a tire engagement member or saddle toward each other, or otherwise cause compression of first rebounding member section 1210*a*. In this way, first rebounding member section 1210*a* can provide for easy compression by hand. Such action shortens the overall length of the suspension protection system. After first rebounding member section 1210*a* compresses a certain amount, the suspension mount engagement member can contact a proximal end 1230*a* of second rebounding member section 1220*a*, such that application of additional compressive force to the system is absorbed by second rebounding member section 1220*a*, either alone or in combination with first rebounding member section 1210*a*. In some cases second rebounding member section 1220*a* will have a sufficiently low compressibility such that compression of second rebounding member section 1220*a*, either alone or in combination with compression of first rebounding member section 1210*a*, may be difficult to achieve manually. When the length of the suspension protection system is shortened or adjusted sufficiently or as desired by the operator, the operator can place the suspension protection system between the suspension mount and the tire. The operator can then release or reduce the compressive force to the system, so as to allow first rebounding member section 1210a to lengthen. Hence, the length of the system increases until the suspension mount engagement member contacts the suspension mount, and the tire engagement member contacts the tire. In this way, a system such as a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, the suspension mount and tire are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, the suspension protection system can be compressed such that first rebounding member section 1210a is shortened and the suspension mount engagement member contacts second rebounding member section 1220a. As additional cinching force is applied, either second rebounding member section 1220a alone, or second rebounding member section 1220a in concert with first rebounding member section 1210a, compresses. Hence, the length of the system can be further reduced. In this way, second rebounding member section 1220a, and optionally to a lesser degree first rebounding member section 1210a, can take the significant load associated with tightening a motorcycle to a trailer or truck bed. Due to the relatively low compressibility of second rebounding member section 1220a, the suspension protection system can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, the suspension protection system can also prevent the suspension of the motorcycle from becoming subject to unwanted levels of compression. For example, during such compressive events, second compression member section 1220a, optionally in combination with first compression member section 1210a, can compress and the length of the system can be reduced. Conversely, when transient compressive events are completed or diminished, second compression member section 1220a, optionally in combination with first compression member section 1210a, can decompress and the length of the system can be increased.

As shown in FIG. 12B, rebounding member 1200b includes a first rebounding member section 1210b and a second rebounding member section 1220b. As depicted here, first rebounding member section 1210b is more compressible than second rebounding member section 1220b. For example, first rebounding member section 1210b can be an annular cylindrical elastomer portion having a first compressibility rating, and second rebounding member section 1220b can be a cylindrical elastomer portion having a second compressibility rating, wherein the first compressibility rating is higher than the second compressibility rating.

In use or as part of an installation procedure, an operator can apply or increase a compressive force to a suspension protection system that includes rebounding member 1200b. For example, an operator can urge a suspension mount engagement member and a tire engagement member or saddle toward each other, or otherwise cause compression of first rebounding member section 1210b. In this way, first rebounding member section 1210b can provide for easy compression by hand. Such action shortens the overall length of the suspension protection system. As shown here, after first rebounding member section 1210b compresses a certain amount, the suspension mount engagement member can contact a proximal end 1230b of second rebounding member section 1220b, such that application of additional compressive force to the system is absorbed by second rebounding member section 1220b, either alone or in combination with first rebounding member section 1210b. In some cases second rebounding member section 1220b will have a sufficiently low compressibility such that compression of second rebounding member section 1220b, either alone or in combination with compression of first rebounding member section 1210b, may be difficult to achieve manually. When the length of the suspension protection system is shortened or adjusted sufficiently or as desired by the operator, the operator can place the suspension protection system between the suspension mount and the tire. The operator can then release or reduce the compressive force to the system, so as to allow first rebounding member section 1210b to lengthen. Hence, the length of the system increases until the suspension mount engagement member contacts the suspension mount, and the tire engagement member contacts the tire. In this way, a system such as a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, the suspension mount and tire are forced or pressed toward each other. For example, an operator may couple one end of a cinching device to a first handlebar of a motorcycle and the other end of the cinching device to the floor of a truck bed, trailer bed, or transport surface, and then actuate the cinching device to firmly secure the motorcycle to the truck bed, trailer bed, or transport surface. A second cinching device can be attached a second handlebar and the truck bed floor in a similar fashion. By attaching cinching devices or straps to the motorcycle and floor, the suspension protection system can be compressed such that first rebounding member section 1210a is shortened and the suspension mount engagement member contacts second rebounding member section 1220b. As additional cinching force is applied, either second rebounding member section 1220b alone, or second rebounding member section 1220b in concert with first rebounding member section 1210b, compresses. Hence, the length of the system can be further reduced. In this way, second rebounding member section 1220b, and optionally to a lesser degree first rebounding member section 1210b, can take the significant load associated with tightening a motorcycle to a trailer or truck bed. Due to the relatively low compressibility of second rebounding member section 1220b, the suspension protection system can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, the suspension protection system can also prevent the suspension of the motorcycle from becoming subject to unwanted levels of compression. For example, during such compressive events, second compression member section 1220b, optionally in combination with first compression member section 1210b, can compress and the length of the system can be reduced. Conversely, when transient compressive events are completed or diminished, second compression member section 1220b, optionally in combination with first compression member section 1210b, can decompress and the length of the system can be increased.

Hence, rebounding members 1200a or 1200b as shown in FIGS. 12A and 12B, respectively, can provide rebounding assembly that has compressibility profile with a first compressibility corresponding to a first compression distance, and a second compressibility corresponding to a second compression distance, such that the first compressibility is higher than the second compressibility, and the first compression distance is smaller than the second compression distance.

Figure 13:
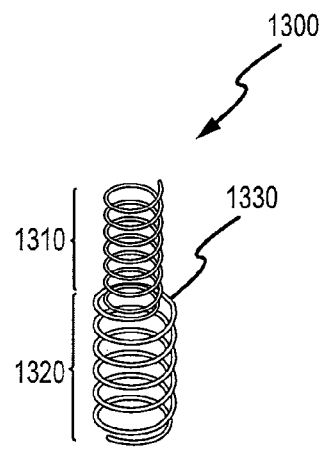
FIG. 13 shows a rebounding member according to embodiments of the present invention.

FIG. 13 shows a single element rebounding member for use with a suspension protection system according to embodiments of the present invention. Such a single element rebounding member can provide a system protection system with a variable compressibility profile. As shown in FIG. 13, rebounding member 1300 includes a first rebounding member section 1310 and a second rebounding member section 1320. As depicted here, first rebounding member section 1310 is more compressible than second rebounding member section 1320. For example, first rebounding member section 1310 can be a spring portion having a first compressibility rating, and second rebounding member section 1320 can be a spring portion having a second compressibility rating, wherein the first compressibility rating is higher than the second compressibility rating.

In use or as part of an installation procedure, an operator can apply or increase a compressive force to a suspension protection system that includes rebounding member 1300. For example, an operator can urge a suspension mount engagement member and a tire engagement member or saddle toward each other, or otherwise cause compression of first rebounding member section 1310. In this way, first rebounding member section 1310 can provide for easy compression by hand. Such action shortens the overall length of the suspension protection system. After first rebounding member section 1310 compresses a certain amount, the suspension mount engagement member can contact a proximal end 1330 of second rebounding member section 1320, such that application of additional compressive force to the system is absorbed by second rebounding member section 1320, either alone or in combination with first rebounding member section 1310. In some cases second rebounding member section 1320 will have a sufficiently low compressibility such that compression of second rebounding member section 1320, either alone or in combination with compression of first rebounding member section 1310, may be difficult to achieve manually. When the length of the suspension protection system is shortened or adjusted sufficiently or as desired by the operator, the operator can place the suspension protection system between the suspension mount and the tire. The operator can then release or reduce the compressive force to the system, so as to allow first rebounding member section 1310 to lengthen. Hence, the length of the system increases until the suspension mount engagement member contacts the suspension mount, and the tire engagement member contacts the tire. In this way, a system such as a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, the suspension mount and tire are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, the suspension protection system can be compressed such that first rebounding member section 1310 is shortened and the suspension mount engagement member contacts second rebounding member section 1320. As additional cinching force is applied, either second rebounding member section 1320 alone, or second rebounding member section 1320 in concert with first rebounding member section 1310, compresses. Hence, the length of the system can be further reduced. In this way, second rebounding member section 1320, and optionally to a lesser degree first rebounding member section 1310, can take the significant load associated with tightening a motorcycle to a trailer or truck bed. Due to the relatively low compressibility of second rebounding member section 1320, the suspension protection system can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, the suspension protection system can also prevent the suspension of the motorcycle from becoming subject to unwanted levels of compression. For example, during such compressive events, second compression member section 1320, optionally in combination with first compression member section 1310, can compress and the length of the system can be reduced. Conversely, when transient compressive events are completed or diminished, second compression member section 1320, optionally in combination with first compression member section 1310, can decompress and the length of the system can be increased.

Hence, rebounding member 1300 can provide a rebounding assembly that has compressibility profile with a first compressibility corresponding to a first compression distance, and a second compressibility corresponding to a second compression distance, such that the first compressibility is higher than the second compressibility, and the first compression distance is smaller than the second compression distance.

Figure 14:
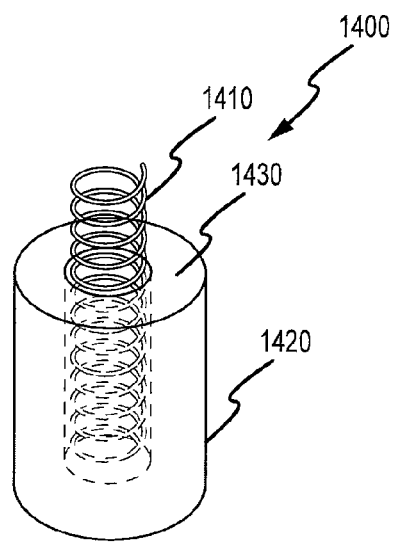
FIG. 14 shows a rebounding assembly according to embodiments of the present invention.

FIG. 14 shows a hybrid rebounding assembly 1400 for use with a suspension protection system according to embodiments of the present invention. Such a hybrid rebounding assembly can provide a system protection system with a variable compressibility profile. As shown in FIG. 14, rebounding member 1400 includes a first rebounding member 1410 and a second rebounding member section 1420. As depicted here, first rebounding member 1410 is more compressible than second rebounding member 1420. For example, first rebounding member 1410 can be a spring having a first compressibility rating, and second rebounding member 1420 can be an annular cylindrical elastomer having a second compressibility rating, wherein the first compressibility rating is higher than the second compressibility rating.

In use or as part of an installation procedure, an operator can apply or increase a compressive force to a suspension protection system that includes rebounding assembly 1400. For example, an operator can urge a suspension mount engagement member and a tire engagement member or saddle toward each other, or otherwise cause compression of first rebounding member 1410. In this way, first rebounding member 1410 can provide for easy compression by hand. Such action shortens the overall length of the suspension protection system. As shown here, after first rebounding member 1410 compresses a certain amount, the suspension mount engagement member can contact a proximal end 1430 of second rebounding member 1420, such that application of additional compressive force to the system is absorbed by second rebounding member 1420, either alone or in combination with first rebounding member 1410. In some cases second rebounding member 1420 will have a sufficiently low compressibility such that compression of second rebounding member 1420, either alone or in combination with compression of first rebounding member 1410, may be difficult to achieve manually. When the length of the suspension protection system is shortened or adjusted sufficiently or as desired by the operator, the operator can place the suspension protection system between the suspension mount and the tire. The operator can then release or reduce the compressive force to the system, so as to allow first rebounding member 1410 to lengthen. Hence, the length of the system increases until the suspension mount engagement member contacts the suspension mount, and the tire engagement member contacts the tire. In this way, a system such as a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, the suspension mount and tire are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, the suspension protection system can be compressed such that first rebounding member 1410 is shortened and the suspension mount engagement member contacts second rebounding member 1420. As additional cinching force is applied, either second rebounding member 1420 alone, or second rebounding member 1420 in concert with first rebounding member 1410, compresses. Hence, the length of the system can be further reduced. In this way, second rebounding member 1420, and optionally to a lesser degree first rebounding member 1410, can take the significant load associated with tightening a motorcycle to a trailer or truck bed. Due to the relatively low compressibility of second rebounding member 1420, the suspension protection system can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, the suspension protection system can also prevent the suspension of the motorcycle from becoming subject to unwanted levels of compression. For example, during such compressive events, second compression member 1420, optionally in combination with first compression member 1410, can compress and the length of the system can be reduced. Conversely, when transient compressive events are completed or diminished, second compression member 1420, optionally in combination with first compression member 1410, can decompress and the length of the system can be increased.

Hence, rebounding members 1410 and 1420 can provide rebounding assembly 1400 that has compressibility profile with a first compressibility corresponding to a first compression distance, and a second compressibility corresponding to a second compression distance, such that the first compressibility is higher than the second compressibility, and the first compression distance is smaller than the second compression distance.

Figure 15:
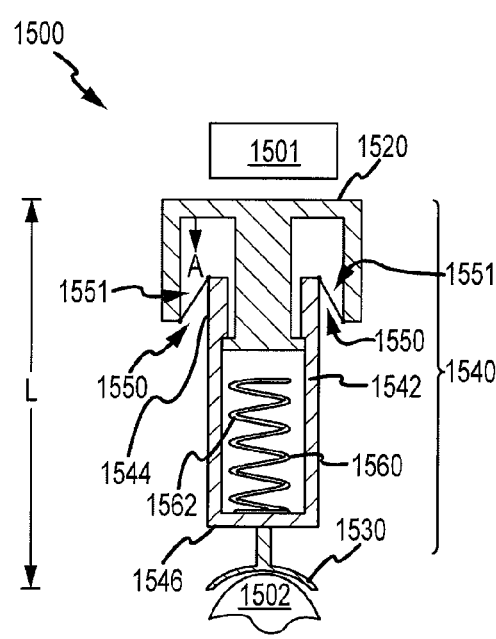
FIG. 15 shows a suspension protection system according to embodiments of the present invention.

FIG. 15 illustrates a suspension protection system according to embodiments of the present invention. Such a suspension protection system can exhibit a variable compressibility profile. As shown in FIG. 15, suspension protection system 1500 includes a suspension mount engagement member or fender cap 1520, a tire engagement member 1530, and a rebounding assembly 1540 coupled between suspension mount engagement member 1520 and tire engagement member 1530. Suspension mount engagement member 1520 is configured to contact a suspension mount 1501 of a vehicle and tire engagement member 1530 is configured to contact a tire 1502 of the vehicle. Rebounding assembly 1540 includes a support 1542 having a proximal end 1544 and a distal end 1546, a first rebounding member 1550, and a second rebounding member 1560. Rebounding member 1550 includes a stretchable member 1551 such as a spring or an elasticized rope, cord, string, tape, bungee, annular diaphragm, or the like. When suspension protection system 1500 is compressed, the stretchable member 1551 stretches to absorb the energy of the compression. Conversely, as compressive forces on the system are relaxed, the stretchable member 1551 contracts. When stretchable member 1551 stretches, suspension mount engagement member 1520 and support 1542 more relative to each other in a rebounding fashion. In this sense, stretchable member 1551, and in turn first rebounding member 1550, confers a compressibility to the system. As described herein, the term compressibility can encompass the elasticity or stretchability of the first rebounding member or stretchable member, such that the first rebounding member or stretchable member can be characterized in terms of compressibility as it stretches. This can be due in part to the fact that the system as a whole can compress when the rebounding or stretchable member is elongated or extended. In some embodiments, the compressibility of the rebounding member or stretchable member can be expressed, characterized, or otherwise directly related to the extendability, expandability, stretchability, elongatability, or the like, of the rebounding member or stretchable member. As depicted here, first rebounding member 1550 is more compressible than second rebounding member 1560, and suspension mount engagement member 1520 is configured to move relative to support 1542. For example, first rebounding member 1550 can include a light elasticized cord, and second rebounding member 1560 can include a heavy spring.

In use or as part of an installation procedure, an operator can apply or increase a compressive force to system 1500. For example, an operator can urge suspension mount engagement member 1520 and tire engagement member or saddle 1530 toward each other, or otherwise cause suspension mount engagement member 1520 to translate relative to support or cylinder 1542 as indicated by arrow A, so as to compress first rebounding member 1550. As shown here, compression of first rebounding member 1550 can be characterized as a lengthening, stretching, extending, or expanding of the rebounding member or stretchable member. In this way, a lightly elasticized band or cord can provide for easy compression by hand. Such action shortens the overall length L of suspension protection system 1500. As shown here, after first rebounding member 1550 compresses a certain amount, a proximal portion 1562 of second rebounding member 1560 can contact suspension mount engagement member 1520. When length L is shortened or adjusted sufficiently or as desired by the operator, the operator can place suspension protection system 1500 between suspension mount or fender 1501 and tire 1502. The operator can then release or reduce the compressive force to system 1500, so as to allow first rebounding member 1550 to relax. This action is accompanied by movement of suspension mount engagement member 1520 relative to support 1542, in the direction opposite of arrow A, so that length L of system 1500 increases until suspension mount engagement member 1520 contacts suspension mount 1501, and tire engagement member 1530 contacts tire 1502. In this way, system 1500, which may be a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, suspension mount 1501 and tire 1502 are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, system 1500 can be compressed such that first rebounding member 1550 is drawn more tautly and second rebounding member 1560 contacts suspension mount engagement member 1520. As additional cinching force is applied, second rebounding member 1560 can compress and length L of system 1500 can be further reduced. In this way, a heavy spring can take the significant load associated with tightening a motorcycle to a trailer or truck bed. Due to the relatively low compressibility of second rebounding member 1560, system 1500 can protect the suspension system of the motorcycle which would otherwise absorbs the compressive load or a portion thereof which results from cinching or strapping to the transport surface.

During transport, as the motorcycle is subject to compressive forces such as travel over bumpy roads, braking, and cornering events, system 1500 can also prevent the suspension of the motorcycle from becoming subject to unwanted levels of compression. For example, during such compressive events, suspension mount engagement member 1520 can continue to move in the direction indicated by arrow A, and second rebounding member 1560 can therefore compress and length L of system 1500 can be further reduced. Conversely, when transient compressive events are completed or diminished, suspension mount engagement member 1520 can then move in a direction opposite of the direction indicated by arrow A, and second rebounding member 1560 can therefor expand and length L of system 1500 can be increased.

Hence, rebounding members 1550 and 1560 can provide rebounding assembly 1540 that has compressibility profile with a first compressibility corresponding to a first compression distance, and a second compressibility corresponding to a second compression distance, such that the first compressibility is higher than the second compressibility, and the first compression distance is smaller than the second compression distance.

Figure 16:
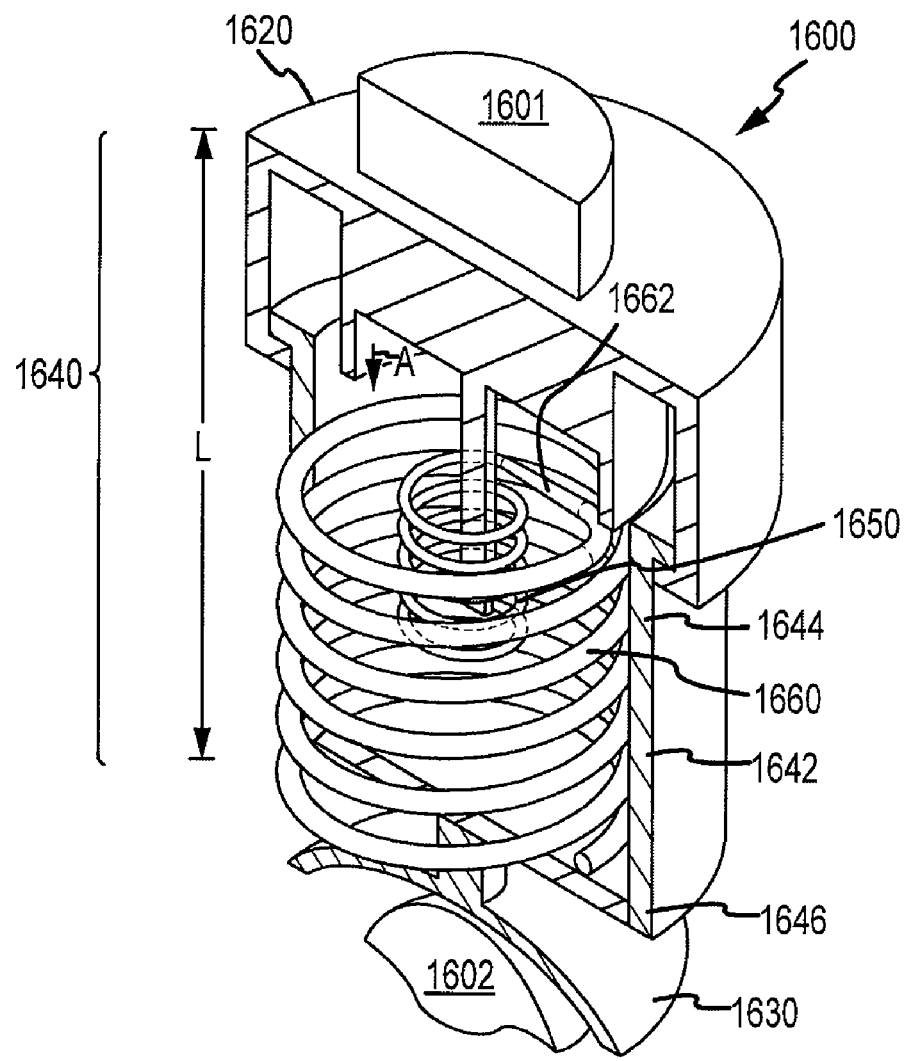
FIG. 16 shows a suspension protection system according to embodiments of the present invention.

FIG. 16 illustrates a suspension protection system according to embodiments of the present invention. Such a suspension protection system can exhibit a variable compressibility profile. As shown in FIG. 16, suspension protection system 1600 includes a suspension mount engagement member or fender cap 1620, a tire engagement member 1630, and a rebounding assembly 1640 coupled between suspension mount engagement member 1620 and tire engagement member 1630. Suspension mount engagement member 1620 is configured to contact a suspension mount 1601 of a vehicle and tire engagement member 1630 is configured to contact a tire 1602 of the vehicle. Rebounding assembly 1640 includes a support 1642 having a proximal end 1644 and a distal end 1646, a first rebounding member 1650, and a second rebounding member 1660. In some embodiments, first rebounding member 1650 and second rebounding member 1660 can be two portions of a single rebounding element, such as a spring. Rebounding member 1650 includes a stretchable member such as a spring or an elasticized rope, cord, string, tape, bungee, annular diaphragm, or the like. When suspension protection system 1600 is compressed, rebounding member 1650 stretches to absorb the energy of the compression. Conversely, as compressive forces on the system are relaxed, the rebounding member 1650 contracts. When rebounding member 1650 stretches, suspension mount engagement member 1620 and support 1642 more relative to each other in a rebounding fashion. In this sense, rebounding member 1650 confers a compressibility to the system. As described herein, the term compressibility can encompass the elasticity or stretchability of rebounding member 1650, such that the first rebounding member can be characterized in terms of compressibility as it stretches. This can be due in part to the fact that the system as a whole can compress when rebounding member 1650 is elongated or extended. In some embodiments, the compressibility of rebounding member 1650 can be expressed, characterized, or otherwise directly related to the extendability, expandability, stretchability, elongatability, or the like, of the rebounding member. As depicted here, first rebounding member 1650 is more compressible than second rebounding member 1660, and suspension mount engagement member 1620 is configured to move relative to support 1642. For example, first rebounding member 1650 can include a light section of a single coil spring, and second rebounding member 1660 can include a heavy section of the same single coil spring.

In use or as part of an installation procedure, an operator can apply or increase a compressive force to system 1600. For example, an operator can urge suspension mount engagement member 1620 and tire engagement member or saddle 1630 toward each other, or otherwise cause suspension mount engagement member 1620 to translate relative to support or cylinder 1642 as indicated by arrow A, so as to compress first rebounding member 1650. As shown here, compression of first rebounding member 1650 can be characterized as a lengthening, stretching, extending, or expanding of the rebounding member. In this way, a light spring or a lightly elasticized band or cord can provide for easy compression by hand. Such action shortens the overall length L of suspension protection system 1600. As shown here, after first rebounding member 1650 compresses a certain amount, a proximal portion 1662 of second rebounding member 1660 can contact suspension mount engagement member 1620, so as to prevent or inhibit further compression of first rebounding member 1650. Suspension mount engagement member may include a central post that can be received within first rebounding member 1650, and a distal portion of the post can be coupled with a distal portion of the first rebounding member. When length L is shortened or adjusted sufficiently or as desired by the operator, the operator can place suspension protection system 1600 between suspension mount or fender 1601 and tire 1602. The operator can then release or reduce the compressive force to system 1600, so as to allow first rebounding member 1650 to relax. This action is accompanied by movement of suspension mount engagement member 1620 relative to support 1642, in the direction opposite of arrow A, so that length L of system 1600 increases until suspension mount engagement member 1620 contacts suspension mount 1601, and tire engagement member 1630 contacts tire 1602. In this way, system 1600, which may be a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, suspension mount 1601 and tire 1602 are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, system 1600 can be compressed such that first rebounding member 1650 is drawn more tautly and second rebounding member 1660 contacts suspension mount engagement member 1620. As additional cinching force is applied, second rebounding member 1660 can compress and length L of system 1600 can be further reduced. In this way, a heavy spring can take the significant load associated with tightening a motorcycle to a trailer or truck bed. Due to the relatively low compressibility of second rebounding member 1660, system 1600 can protect the suspension system of the motorcycle which would otherwise absorbs the compressive load or a portion thereof which results from cinching or strapping to the transport surface.

During transport, as the motorcycle is subject to compressive forces such as travel over bumpy roads, braking, and cornering events, system 1600 can also prevent the suspension of the motorcycle from becoming subject to unwanted levels of compression. For example, during such compressive events, suspension mount engagement member 1620 can continue to move in the direction indicated by arrow A, and second rebounding member 1660 can therefore compress and length L of system 1600 can be further reduced. Conversely, when transient compressive events are completed or diminished, suspension mount engagement member 1620 can then move in a direction opposite of the direction indicated by arrow A, and second rebounding member 1660 can therefor expand and length L of system 1600 can be increased.

Hence, rebounding members 1650 and 1660 can provide rebounding assembly 1640 that has compressibility profile with a first compressibility corresponding to a first compression distance, and a second compressibility corresponding to a second compression distance, such that the first compressibility is higher than the second compressibility, and the first compression distance is smaller than the second compression distance.

Figure 17:
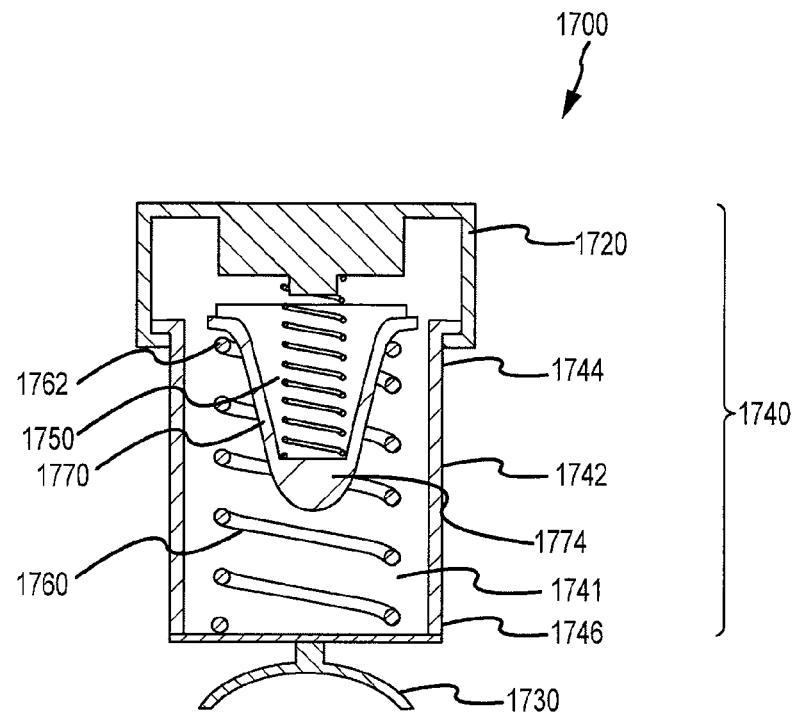
FIG. 17 shows a suspension protection system according to embodiments of the present invention.

FIG. 17 illustrates a cross section view of a suspension protection system 1700. As shown here, suspension protection system 1700 includes a suspension mount engagement member 1720, a tire engagement member 1730, and a rebounding assembly 1740 coupled between suspension mount engagement member 1720 and tire engagement member 1730. Suspension mount engagement member 1720 is configured to contact a suspension mount of a vehicle and tire engagement member 1730 is configured to contact a tire of the vehicle. Rebounding assembly 1740 includes a support 1742 having a proximal end 1744 and a distal end 1746, a first rebounding member 1750, and a second rebounding member 1760. Optionally, rebounding assembly 1740 can include one or more fluids in an interior reservoir, receptacle, or other space 1741. First rebounding member 1750 is disposed toward proximal end 1744 of support 1742, between a portion of support 1742 and suspension mount engagement member 1720. Second rebounding member 1760 is disposed toward distal end 1746 of support 1742, between a portion of support 1742 and tire engagement member 1730. In some embodiments, first rebounding member 1750 is more compressible than second rebounding member 1760.

First rebounding member 1750 as depicted in FIG. 17 includes a first spring. Similarly, second rebounding member 1760 includes a second spring. In some embodiments, first rebounding member 1750 includes a first spring having a first spring rate, and second rebounding member 1760 includes a second spring having a second spring rate, such that the first spring rate is less than the second spring rate. Relatedly, first rebounding member 1750 can be more compressible than second rebounding member 1760. For example, first rebounding member 1750 can include a spring having a first compressibility rating, and second rebounding member 1760 can include a spring having a second compressibility rating, where the first compressibility rating is higher than the second compressibility rating. Suspension protection system 1700 includes a spacer 1770 disposed between first rebounding member 1750 and second rebounding member 1760. Spacer 1770 can be configured to slide or translate longitudinally within support 1742. As shown here, spacer 1770 includes a distal portion 1774 which is conical or tapered shape, having sloping sides.

In use or as part of an installation procedure, an operator can apply or increase a compressive force to a suspension protection system that includes rebounding assembly 1700. For example, an operator can urge a suspension mount engagement member and a tire engagement member or saddle toward each other, or otherwise cause compression of first rebounding member 1750. In this way, first rebounding member 1750 can provide for easy compression by hand. Such action shortens the overall length of the suspension protection system. As shown here, after first rebounding member 1750 compresses a certain amount, the spacer can contact a proximal end 1762 of second rebounding member 1720, such that application of additional compressive force to the system is absorbed by second rebounding member 1760. In some cases second rebounding member 1760 will have a sufficiently low compressibility such that compression of second rebounding member 1760 may be difficult to achieve manually. When the length of the suspension protection system is shortened or adjusted sufficiently or as desired by the operator, the operator can place the suspension protection system between the suspension mount and the tire. The operator can then release or reduce the compressive force to the system, so as to allow first rebounding member 1750 to lengthen. Hence, the length of the system increases until the suspension mount engagement member contacts the suspension mount, and the tire engagement member contacts the tire. In this way, a system such as a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, the suspension mount and tire are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, the suspension protection system can be compressed such that first rebounding member 1750 is shortened and the spacer 1770 contacts second rebounding member 1760. As additional cinching force is applied, either second rebounding member 1760 compresses. Hence, the length of the system can be further reduced. In this way, second rebounding member 1760 can take the significant load associated with tightening a motorcycle to a trailer or truck bed. Due to the relatively low compressibility of second rebounding member 1760, the suspension protection system can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, the suspension protection system can also prevent the suspension of the motorcycle from becoming subject to unwanted levels of compression. For example, during such compressive events, second compression member 1760 can compress and the length of the system can be reduced. Conversely, when transient compressive events are completed or diminished, second compression member 1760 can decompress and the length of the system can be increased.

Hence, rebounding members 1750 and 1760 can provide a rebounding assembly 1740 that has a compressibility profile with a first compressibility corresponding to a first compression distance, and a second compressibility corresponding to a second compression distance, such that the first compressibility is higher than the second compressibility, and the first compression distance is smaller than the second compression distance.

Figures 18A, 18B:
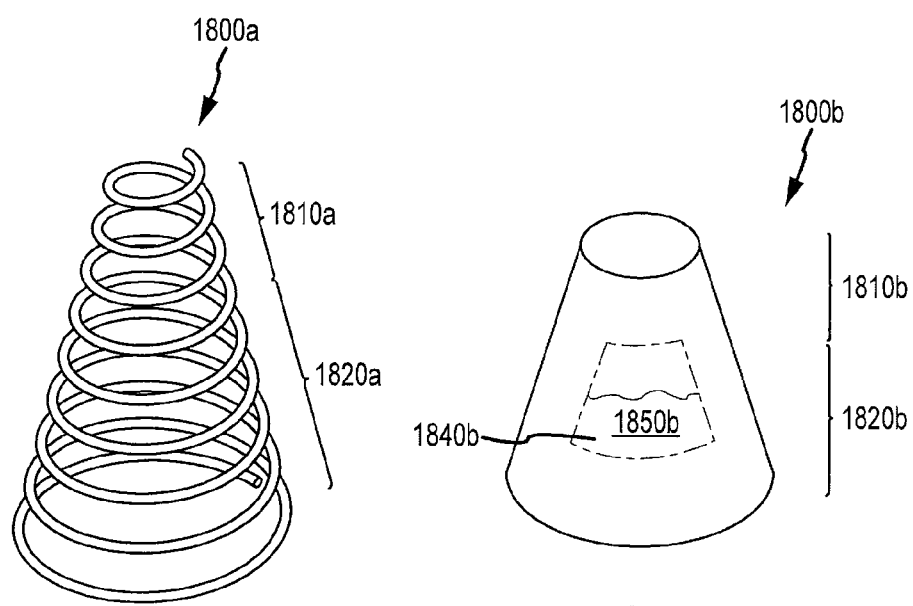
FIGS. 18A and 18B show rebounding members according to embodiments of the present invention.

FIGS. 18A and 18B show rebounding members for use with suspension protection systems according to embodiments of the present invention. Such rebounding members can provide a system protection system with a variable compressibility profile. As shown in FIG. 18A, rebounding member 1800*a* includes a first rebounding member section 1810*a* and a second rebounding member section 1820*a*. As depicted here, first rebounding member section 1810*a* is more compressible than second rebounding member section 1820*a*. For example, first rebounding member section 1810*a* can be a conical or tapered spring portion having a first compressibility rating, and second rebounding member section 1820*a* can be a conical or tapered spring portion having a second compressibility rating, wherein the first compressibility rating is higher than the second compressibility rating.

In use or as part of an installation procedure, an operator can apply or increase a compressive force to a suspension protection system that includes rebounding member 1800*a*. For example, an operator can urge a suspension mount engagement member and a tire engagement member or saddle toward each other, or otherwise cause compression of first rebounding member section 1810*a*. In this way, first rebounding member section 1810*a* can provide for easy compression by hand. Such action shortens the overall length of the suspension protection system. After first rebounding member section 1810*a* compresses a certain amount, second rebounding member 1820*a* effectively absorbs compressive forces as they are applied to the rebounding member, either alone or in combination with first rebounding member section 1810*a*. In some cases second rebounding member section 1820*a* will have a sufficiently low compressibility such that compression of second rebounding member section 1820*a*, either alone or in combination with compression of first rebounding member section 1810*a*, may be difficult to achieve manually. When the length of the suspension protection system is shortened or adjusted sufficiently or as desired by the operator, the operator can place the suspension protection system between the suspension mount and the tire. The operator can then release or reduce the compressive force to the system, so as to allow first rebounding member section 1810*a* to lengthen. Hence, the length of the system increases until the suspension mount engagement member contacts the suspension mount, and the tire engagement member contacts the tire. In this way, a system such as a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, the suspension mount and tire are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, the suspension protection system can be compressed such that first rebounding member section 1810*a* is shortened and the suspension mount engagement member contacts second rebounding member section 1820*a*. As additional cinching force is applied, either second rebounding member section 1820*a* alone, or second rebounding member section 1820*a* in concert with first rebounding member section 1810*a*, compresses. Hence, the length of the system can be further reduced. In this way, second rebounding member section 1820*a*, and optionally to a lesser degree first rebounding member section 1810*a*, can take the significant load associated with tightening a motorcycle to a trailer or truck bed. Due to the relatively low compressibility of second rebounding member section 1820*a*, the suspension protection system can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, the suspension protection system can also prevent the suspension of the motorcycle from becoming subject to unwanted levels of compression. For example, during such compressive events, second compression member section 1820*a*, optionally in combination with first compression member section 1810*a*, can compress and the length of the system can be reduced. Conversely, when transient compressive events are completed or diminished, second compression member section 1820*a*, optionally in combination with first compression member section 1810*a*, can decompress and the length of the system can be increased.

Hence, rebounding member section 1810*a* and 1820*a* of rebounding member 1800*a* can provide a suspension protection system that has a compressibility profile with a first compressibility corresponding to a first compression distance, and a second compressibility corresponding to a second compression distance, such that the first compressibility is higher than the second compressibility, and the first compression distance is smaller than the second compression distance.

As shown in FIG. 18B, rebounding member 1800*b* includes a first rebounding member section 1810*b* and a second rebounding member section 1820*b*. As depicted here, first rebounding member section 1810*b* is more compressible than second rebounding member section 1820*b*. For example, first rebounding member section 1810*b* can be a conical or tapered elastomer portion having a first compressibility rating, and second rebounding member section 1820b can be a conical or tapered elastomer portion having a second compressibility rating, wherein the first compressibility rating is higher than the second compressibility rating. Optionally, rebounding member 1800b can include a reservoir 1840b containing one or more fluids 1850b.

In use or as part of an installation procedure, an operator can apply or increase a compressive force to a suspension protection system that includes rebounding member 1800b. For example, an operator can urge a suspension mount engagement member and a tire engagement member or saddle toward each other, or otherwise cause compression of first rebounding member section 1810b. In this way, first rebounding member section 1810b can provide for easy compression by hand. Such action shortens the overall length of the suspension protection system. After first rebounding member section 1810b compresses a certain amount, second rebounding member 1820b effectively absorbs compressive forces as they are applied to the rebounding member, either alone or in combination with first rebounding member section 1810b. In some cases second rebounding member section 1820b will have a sufficiently low compressibility such that compression of second rebounding member section 1820b, either alone or in combination with compression of first rebounding member section 1810b, may be difficult to achieve manually. When the length of the suspension protection system is shortened or adjusted sufficiently or as desired by the operator, the operator can place the suspension protection system between the suspension mount and the tire. The operator can then release or reduce the compressive force to the system, so as to allow first rebounding member section 1810b to lengthen. Hence, the length of the system increases until the suspension mount engagement member contacts the suspension mount, and the tire engagement member contacts the tire. In this way, a system such as a motorcycle suspension or fork protection system, can be installed on a vehicle such as a motorcycle.

The operator can then strap down or otherwise secure the vehicle with a transport surface, such as a trailer, a truck bed, or the like. Typically, when the vehicle is secured to the transport surface, the suspension mount and tire are forced or pressed toward each other. For example, an operator may couple one end of a cinching device to a first handlebar of a motorcycle and the other end of the cinching device to the floor of a truck bed, and then actuate the cinching device to firmly secure the motorcycle to the truck bed. A second cinching device can be attached a second handlebar and the truck bed floor in a similar fashion. By attaching cinching devices or straps to the motorcycle and floor, the suspension protection system can be compressed such that first rebounding member section 1810b is shortened and the suspension mount engagement member contacts second rebounding member section 1820b. As additional cinching force is applied, either second rebounding member section 1820b alone, or second rebounding member section 1820b in concert with first rebounding member section 1810b, compresses. Hence, the length of the system can be further reduced. In this way, second rebounding member section 1820b, and optionally to a lesser degree first rebounding member section 1810b, can take the significant load associated with tightening a motorcycle to a trailer or track bed. Due to the relatively low compressibility of second rebounding member section 1820b, the suspension protection system can protect the suspension system of the motorcycle which would otherwise absorb the compressive load or a portion thereof which results from cinching or strapping to the transport surface.

During transport, as the motorcycle is subject to compressive forces such as travel over bumpy roads, braking, and cornering events, the suspension protection system can also prevent the suspension of the motorcycle from becoming subject to unwanted levels of compression. For example, during such compressive events, second compression member section 1820b, optionally in combination with first compression member section 1810b, can compress and the length of the system can be reduced. Conversely, when transient compressive events are completed or diminished, second compression member section 1820b, optionally in combination with first compression member section 1810b, can decompress and the length of the system can be increased.

Hence, rebounding member section 1810b and 1820b of rebounding member 1800b can provide a suspension protection system that has a compressibility profile with a first compressibility corresponding to a first compression distance, and a second compressibility corresponding to a second compression distance, such that the first compressibility is higher than the second compressibility, and the first compression distance is smaller than the second compression distance.

Although the rebounding members or sections thereof are primarily discussed above in terms of springs and elastic or elastomeric members, it is appreciated that rebounding members according to embodiments of the present invention may encompass any of a variety of motion resistance elements or mechanisms. For example, rebounding members may include or involve compressible fluids such as air, oil, water, or other fluids or liquids. Moreover, embodiments encompass rebounding assembly or member configurations which include any combination or permutation of the rebounding members or sections or portions thereof discussed herein. Further, any suitable combination or permutation of rebounding members may be used with any of the suspension system structural variations disclosed herein. For example, the rebounding member shown in FIG. 18A can be implemented in the system shown in FIG. 17, either as the first rebounding member or the second rebounding member of system 1700. Embodiments of the present invention also encompass rebounding members or sections or portions thereof which exhibit equivalent or substantially equivalent extension and compression properties, such that roughly equivalent forces are associated with the extension of and compression of the same element. Relatedly, embodiments of the present invention also encompass rebounding members or sections or portions thereof which exhibit dissimilar or nonequivalent extension and compression properties, such that disparate forces are associated with the extension of and compression of the same element. For example, a rebounding member or section or portion thereof may exhibit weak extension properties, such that weaker forces are associated with extension of the element, and also exhibit strong compression properties, such that stronger forces are associated with compression of the element.

Figure 19:
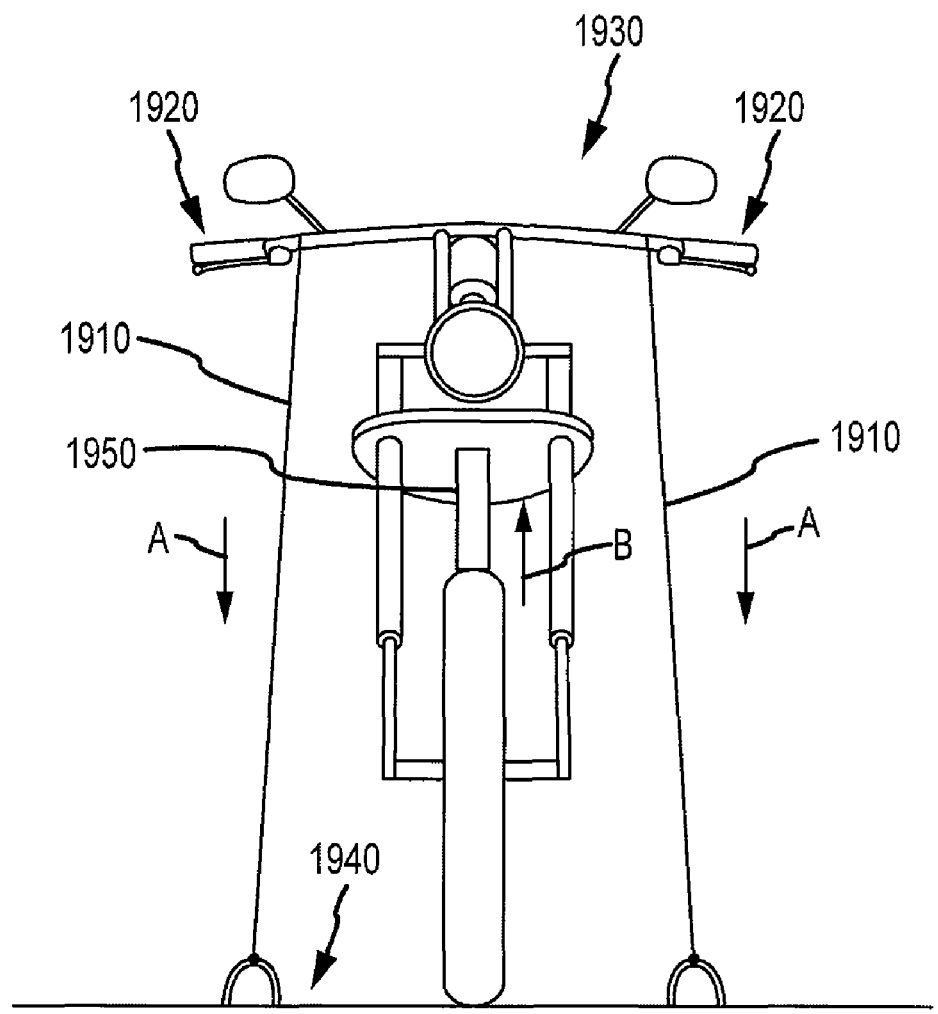
FIG. 19 shows an installed suspension protection system according to embodiments of the present invention.

FIG. 19 illustrates aspects of the beneficial dynamism of opposing forces provided by embodiments of the present invention. As shown here, an operator can attach tie-down straps 1910 to handlebars 1920 of a motorcycle 1930, so as to strap down or otherwise secure motorcycle 1930 with a transport surface 1940, such as a trailer, a truck bed, or the like. When the operator cinches or tightens the tie-down straps, the vehicle becomes fastened or strapped to the transport surface, such that handlebars 1920 are forcibly drawn toward the surface 1940, creating vector forces as indicated by arrows A. Suspension protection system 1950 provides an opposing vector force as indicated by arrow B. This balance of opposing forces can create and enhance stability in the secured motorcycle. Suspension protection system 1950 can continue to provide a significant opposing vector force, even as the system compresses and expands during use. Hence, suspension protection system 1950 is much less likely to become dislodged or displaced during use, as compared with a rigid or substantially rigid mechanism such as a 2×4 block of lumber or similar device. By providing a dynamic opposing force, suspension protection mechanism 1950 can prevent loss of stability during vehicle transport, and provide improved security over existing static devices.

While exemplary embodiments have been described in some detail, by way of example and for clarity of understanding, those of skill in the art will recognize that a variety of modification, adaptations, and changes may be employed. Hence, the scope of the present invention should be limited solely by the claims.

What is claimed is:

1. A method of installing a suspension protection system in a vehicle, comprising:
    compressing the suspension protection system with a first compressive force so as to shorten the suspension protection system;
    placing the compressed suspension protection system between a suspension mount of the vehicle and a tire of the vehicle;
    allowing the system to lengthen such that a suspension mount engagement member of the suspension protection system contacts the suspension mount and a tire engagement member of the suspension protection system contacts the tire; and
    fastening the vehicle relative to a surface with a strap so as to forcibly draw the vehicle suspension mount toward the surface and compress the suspension protection system between the suspension mount and the tire with a second compressive force that is greater than the first compressive force,
    wherein the surface comprises a trailer or a truck bed, and
    wherein the suspension protection system comprises a rebounding assembly coupled between the suspension mount engagement member and the tire engagement member, the rebounding assembly comprising:
    a support having a proximal end and a distal end;
    a first rebounding member disposed toward the proximal end of the support, between the suspension mount engagement member and the tire engagement member; and
    a second rebounding member disposed toward the distal end of the support, between the suspension mount engagement member and the tire engagement member,
    wherein the first rebounding member is disposed proximal to the second rebounding member, and is more compressible than the second rebounding member.

2. The method of claim 1, wherein a first friction force opposes relative movement between the suspension mount engagement member of the suspension protection system and the suspension mount, and a second friction force opposes relative movement between the tire engagement member of the suspension protection system and the tire.

3. The method of claim 1, wherein the first rebounding member comprises a first spring.

4. The method of claim 1, wherein the second rebounding member comprises a second spring.

5. The method of claim 1, wherein the first rebounding member comprises a first spring having a first spring rate, and the second rebounding member comprises a second spring having a second spring rate, such that the first spring rate is less than the second spring rate.

6. The method of claim 1, wherein the first rebounding member comprises a first elastomer.

7. The method of claim 1, wherein the second rebounding member comprises a second elastomer.

8. The method of claim 1, wherein the first rebounding member comprises a first elastomer, the second rebounding member comprises a second elastomer, and the first elastomer is more compressible than the second elastomer.

9. The method of claim 1, wherein the first rebounding member comprises a fluid.

10. The method of claim 1, wherein the second rebounding member comprises a fluid.

* * * * *